May 11, 1937.    M. STUCATUR    2,080,067
TRANSMISSION
Filed Jan. 30, 1932    17 Sheets-Sheet 3

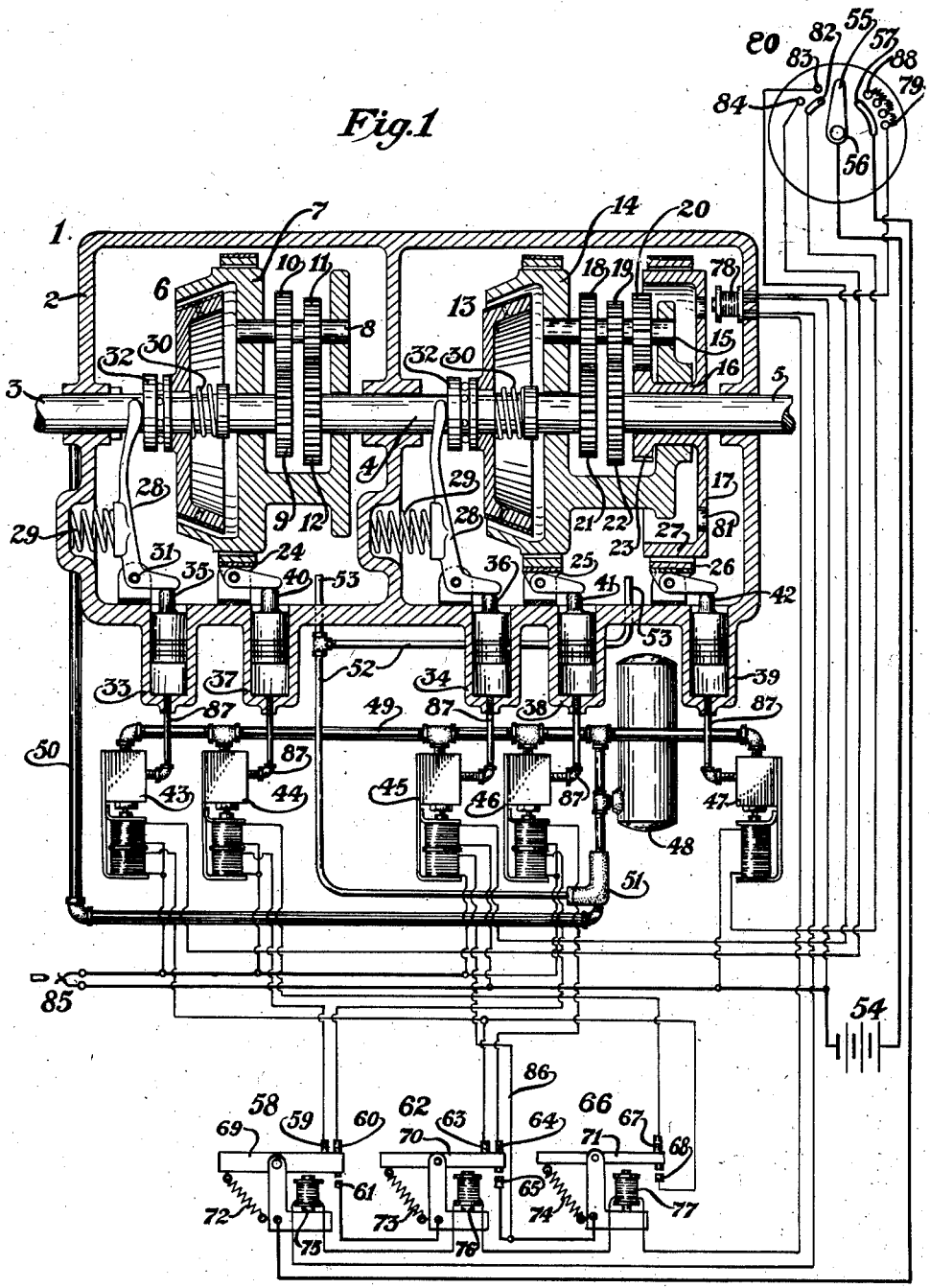

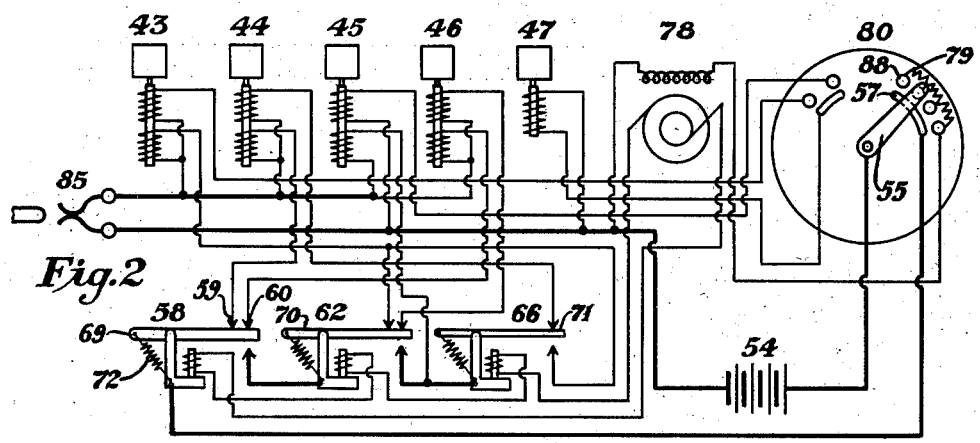
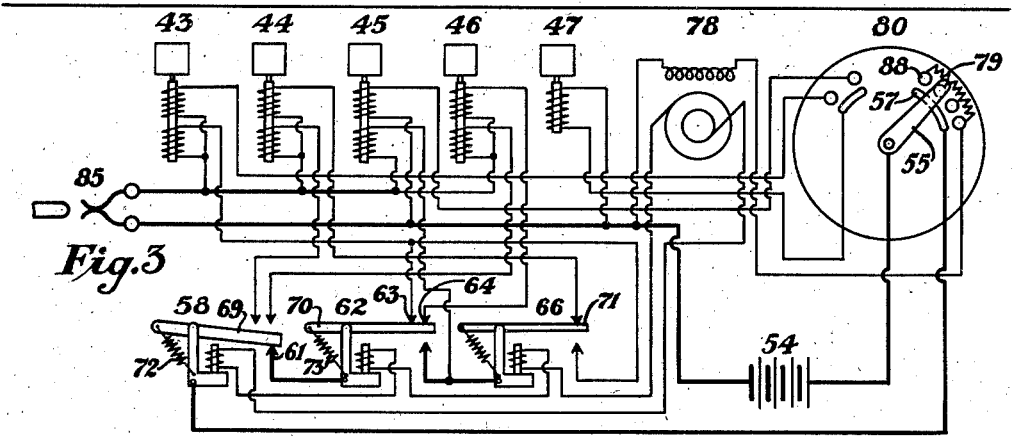
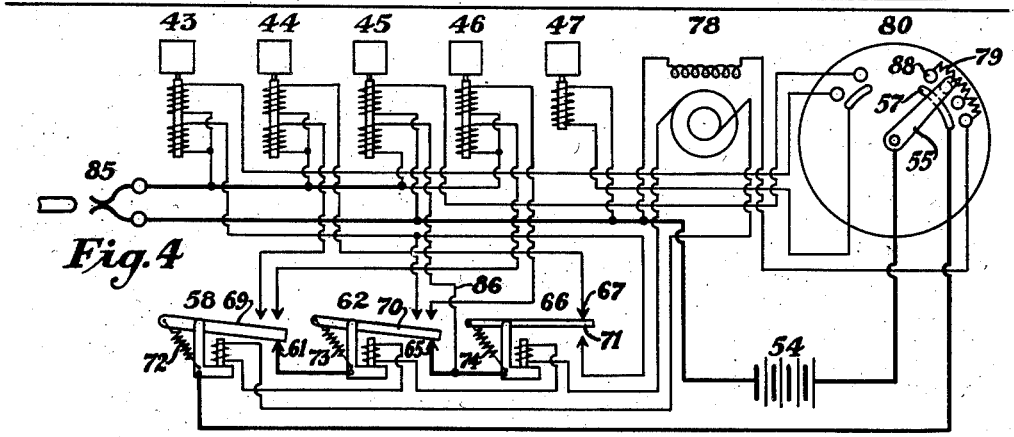

INVENTOR
Matthew Stucatur
BY
A D Caesar
ATTORNEY

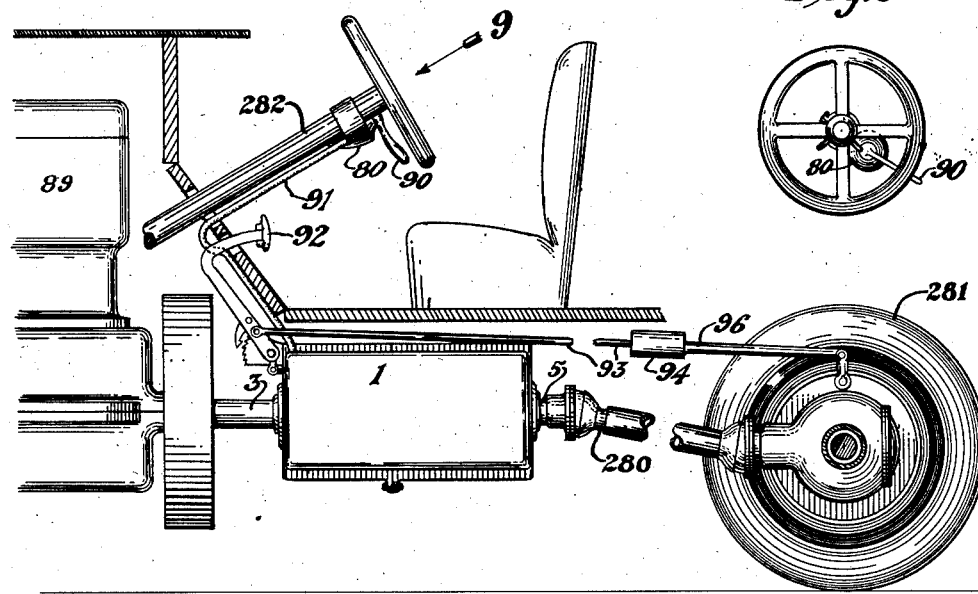
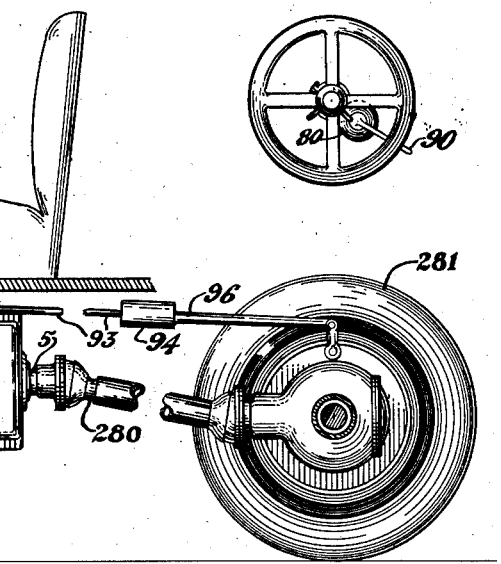
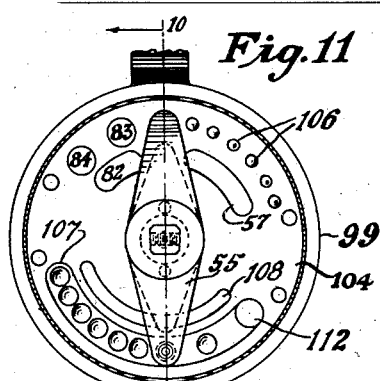
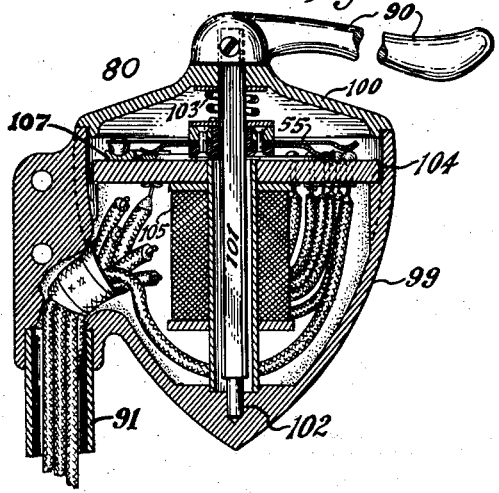
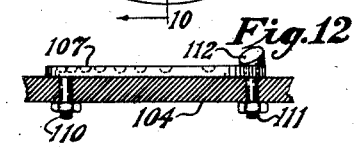

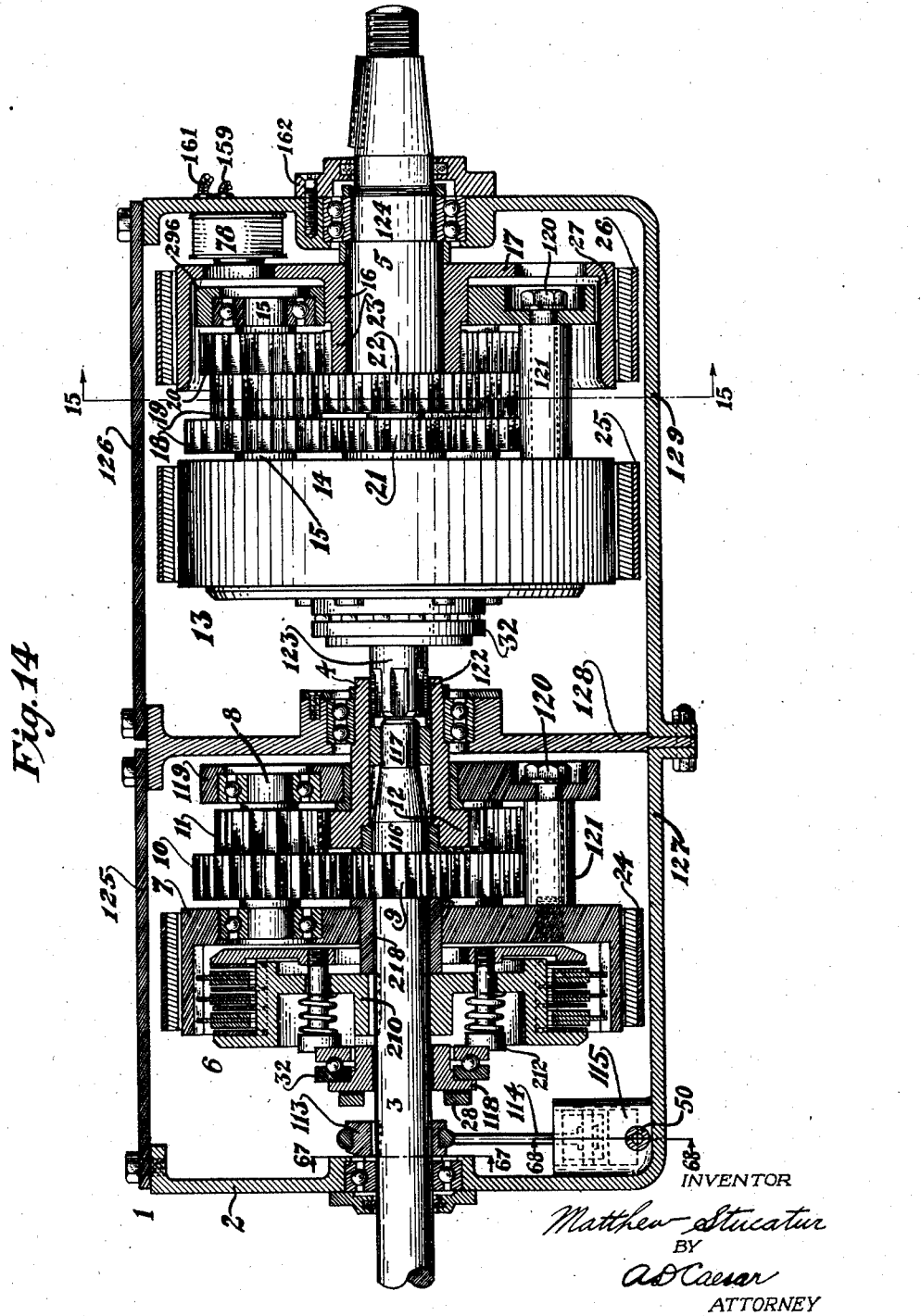

May 11, 1937.  M. STUCATUR  2,080,067
TRANSMISSION
Filed Jan. 30, 1932  17 Sheets-Sheet 6

INVENTOR
Matthew Stucatur
BY
A. D. Caesar
ATTORNEY

May 11, 1937. M. STUCATUR 2,080,067
TRANSMISSION
Filed Jan. 30, 1932 17 Sheets-Sheet 7
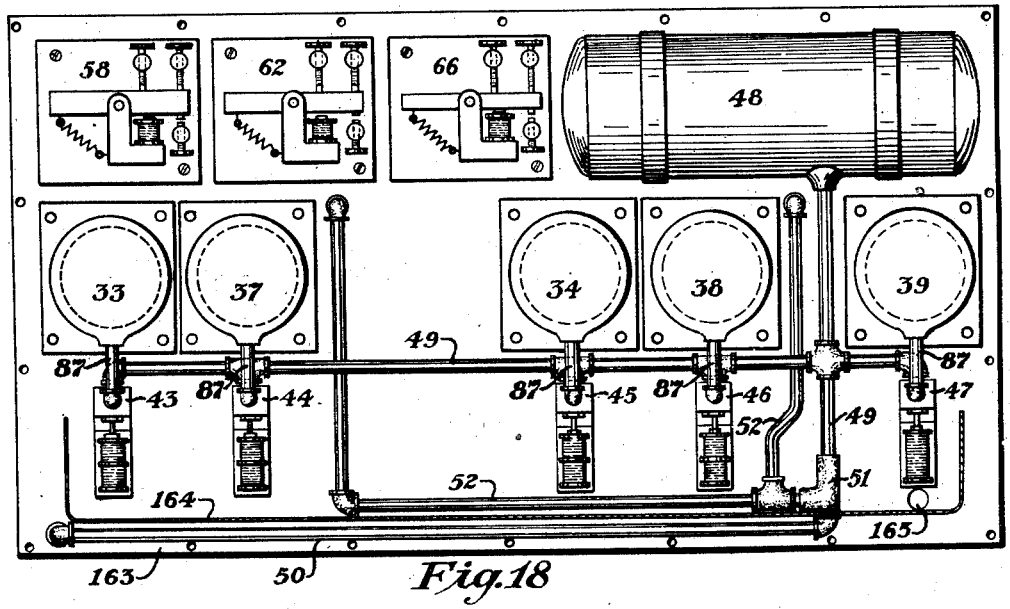
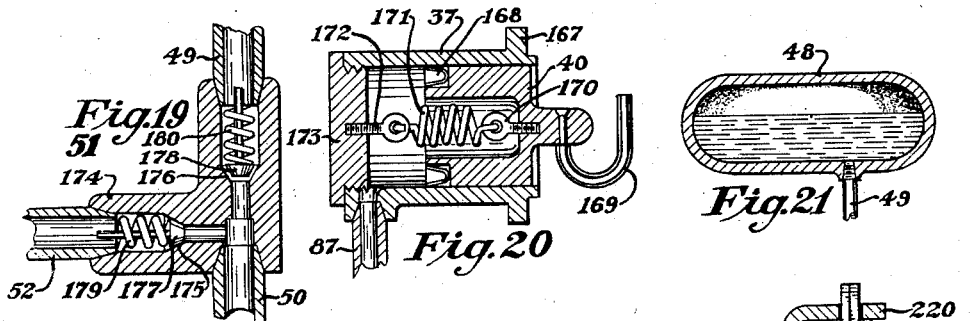
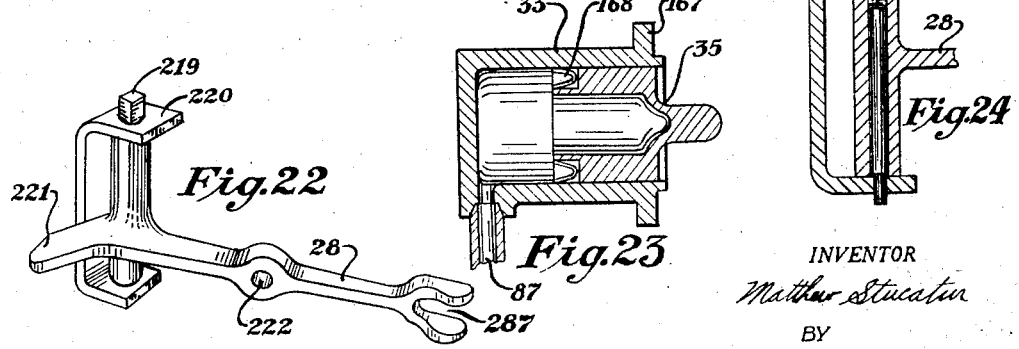
INVENTOR
Matthew Stucatur
BY
A. D. Caesar
ATTORNEY

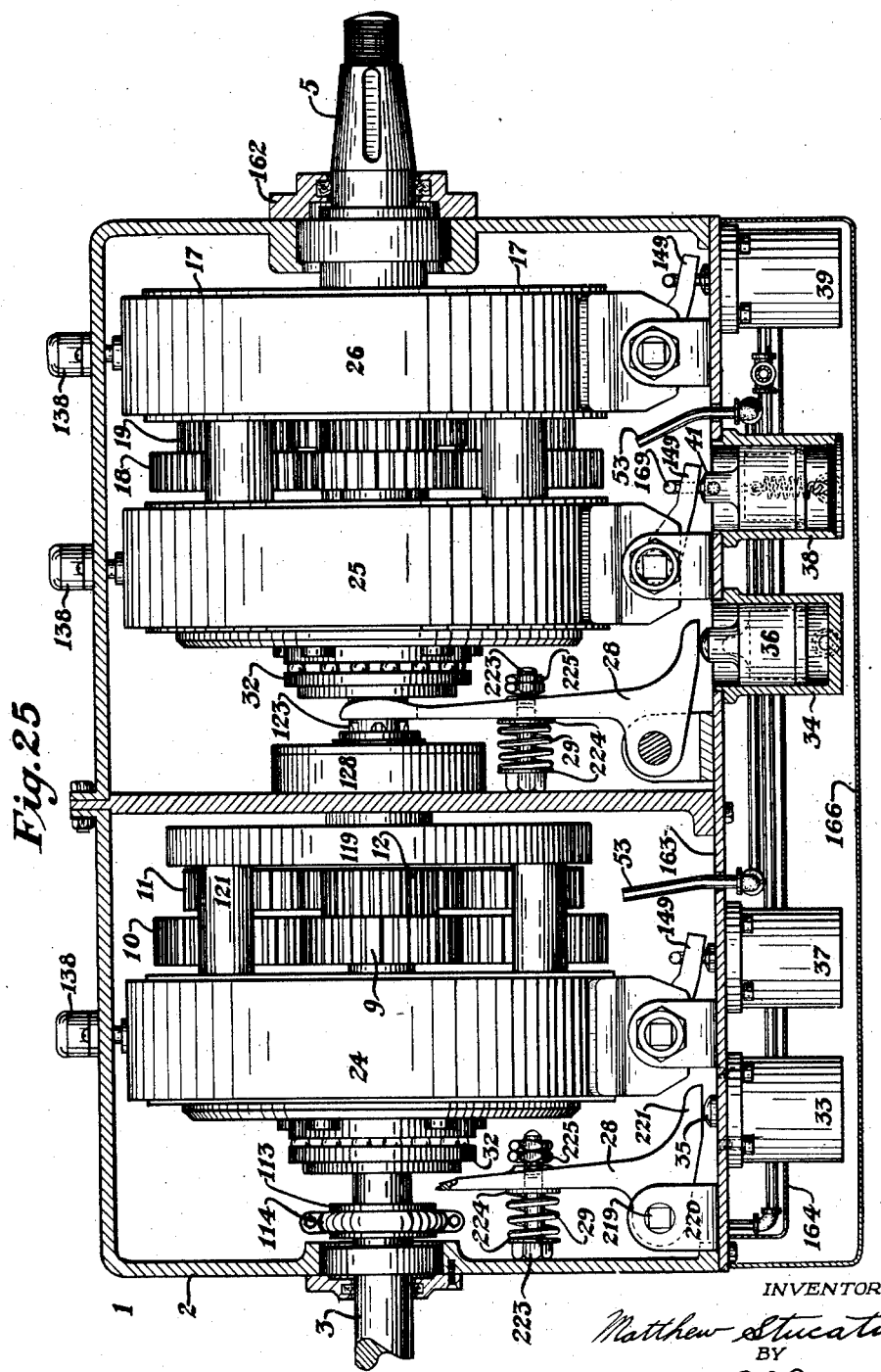

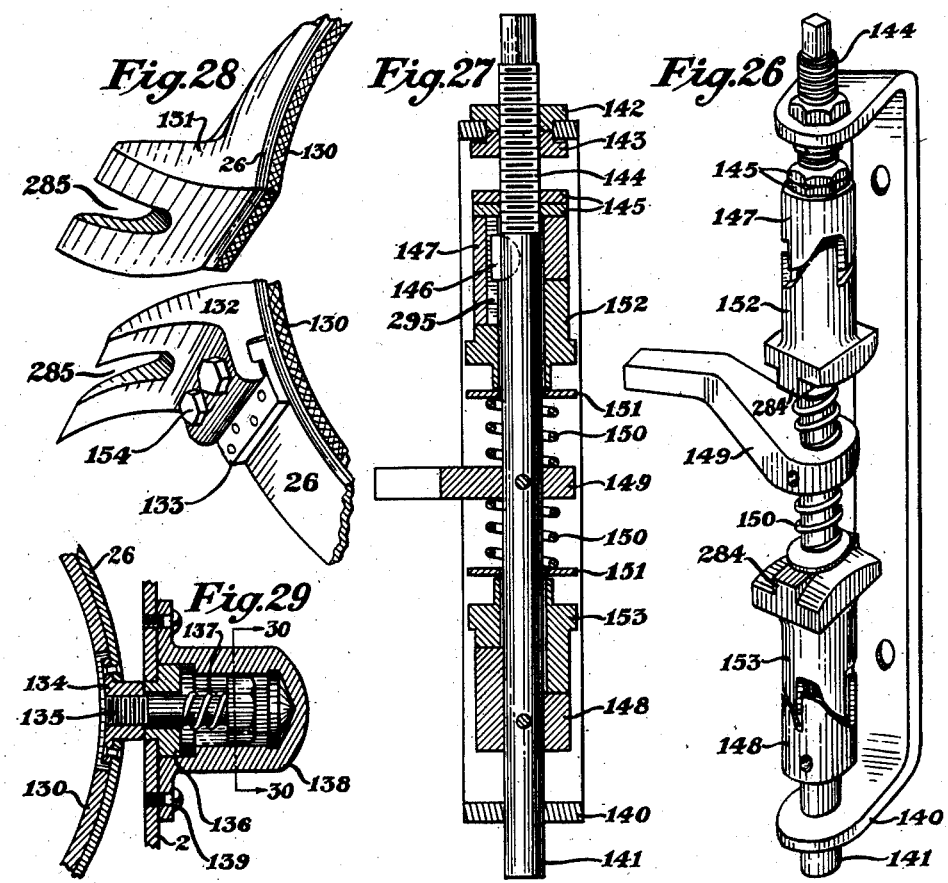
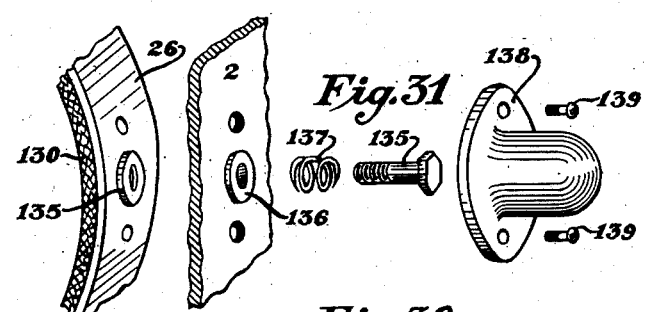
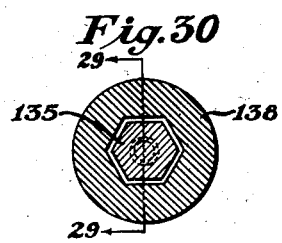

May 11, 1937.  M. STUCATUR  2,080,067
TRANSMISSION
Filed Jan. 30, 1932  17 Sheets-Sheet 10
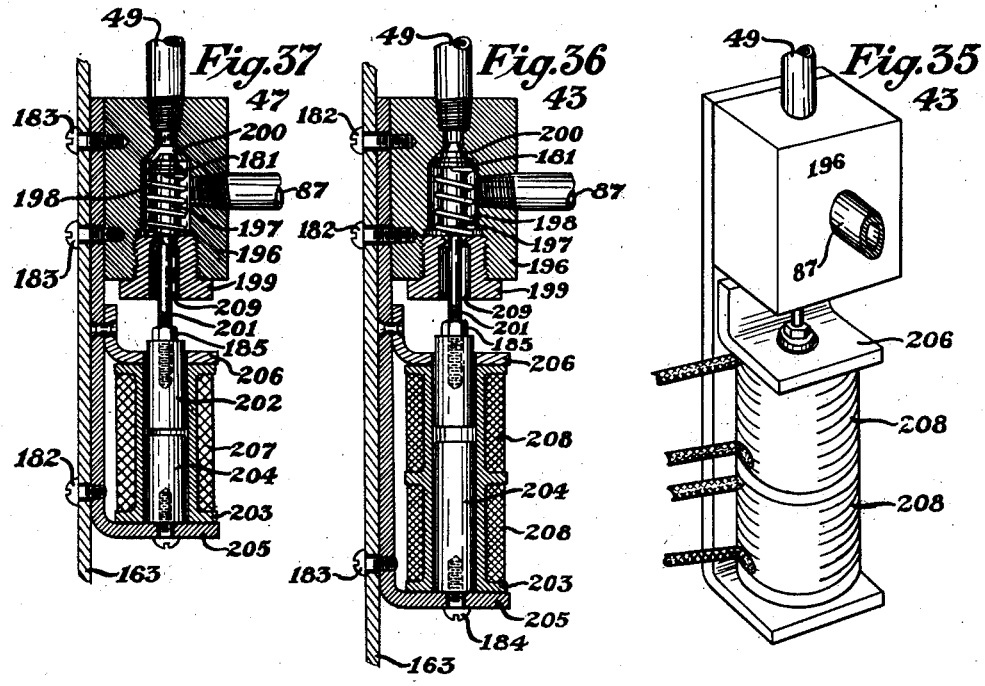
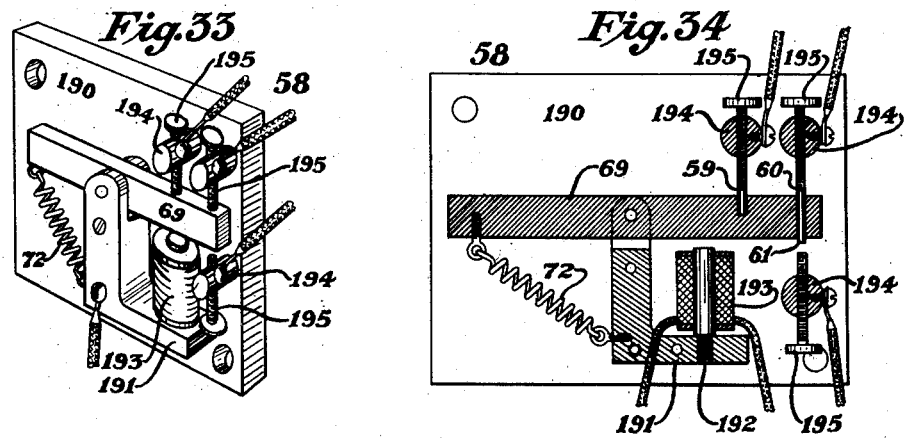
INVENTOR
Matthew Stucatur
BY
A. D. Caesar
ATTORNEY May 11, 1937.  M. STUCATUR  2,080,067
TRANSMISSION
Filed Jan. 30, 1932  17 Sheets-Sheet 11
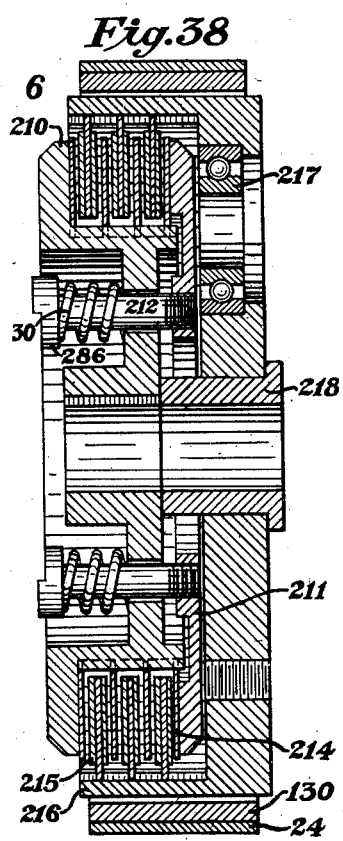
Fig.38
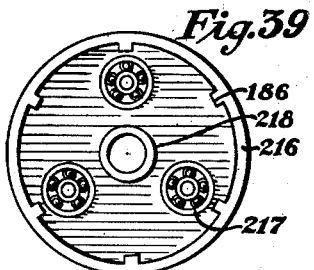
Fig.39
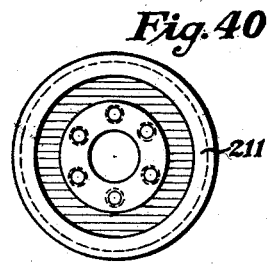
Fig.40
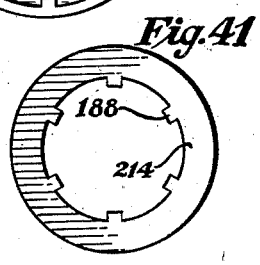
Fig.41
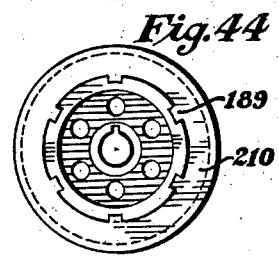
Fig.44
Fig.42
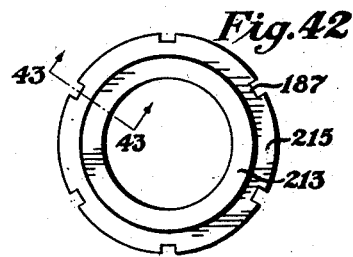
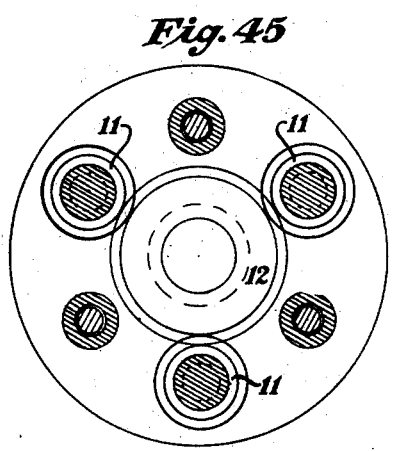
Fig.45
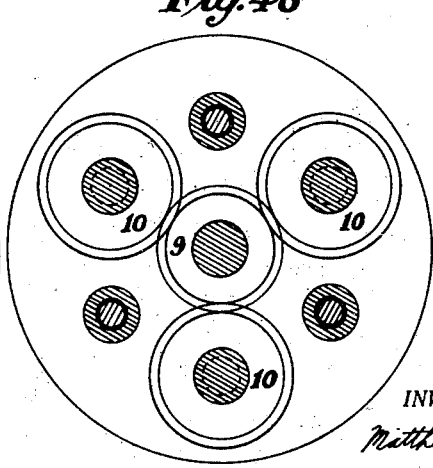
Fig.46
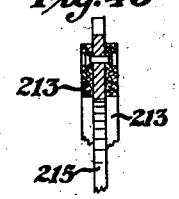
Fig.43
INVENTOR
Matthew Stucatur
BY
A D Caesar
ATTORNEY May 11, 1937.　　　M. STUCATUR　　　2,080,067
TRANSMISSION
Filed Jan. 30, 1932　　　17 Sheets—Sheet 12
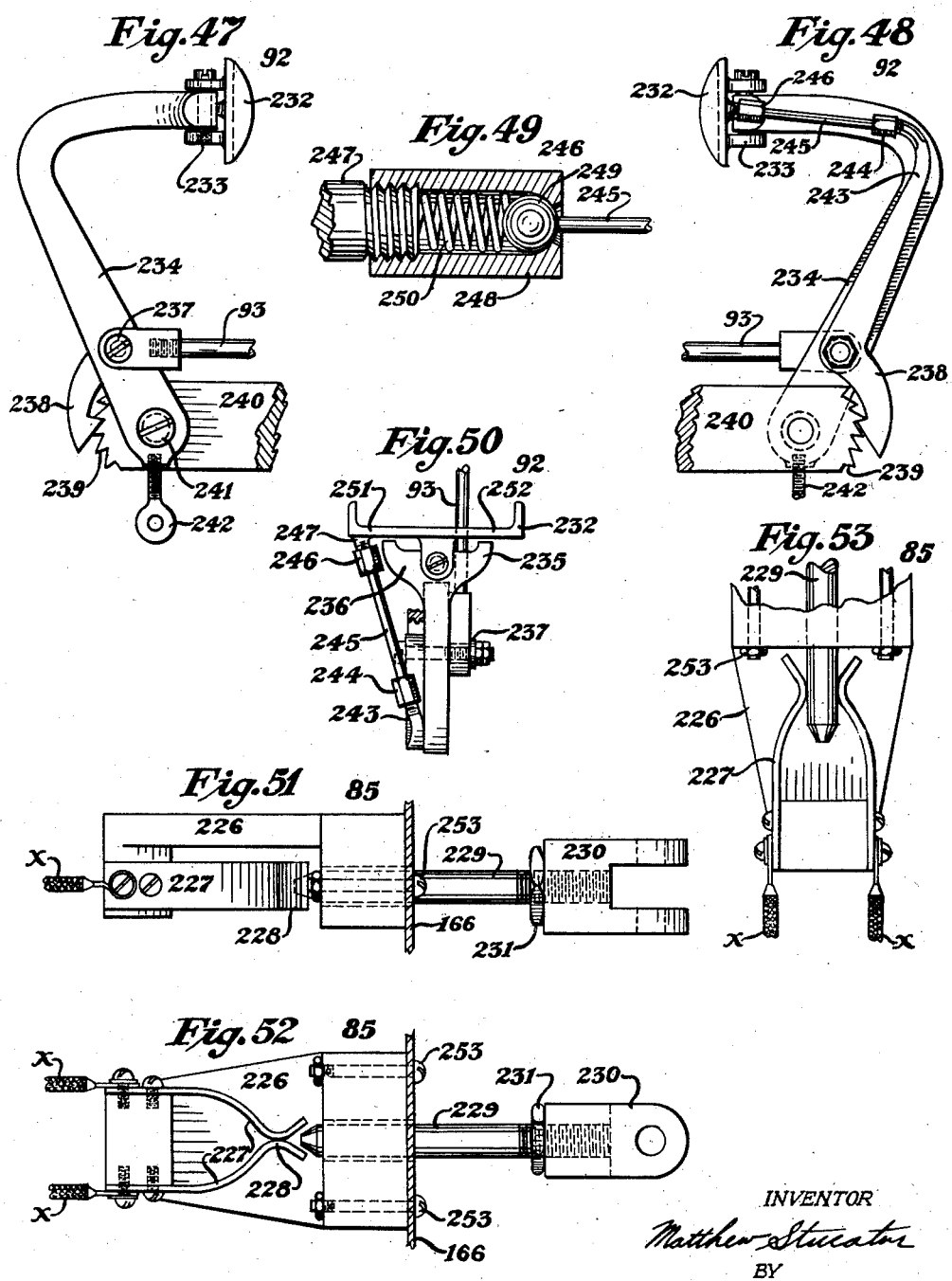

May 11, 1937.  M. STUCATUR  2,080,067
TRANSMISSION
Filed Jan. 30, 1932  17 Sheets-Sheet 13
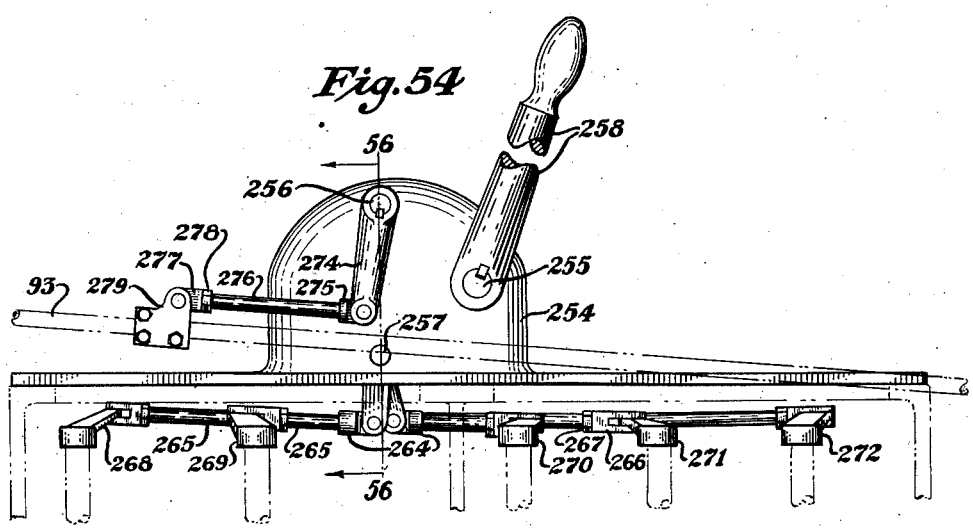
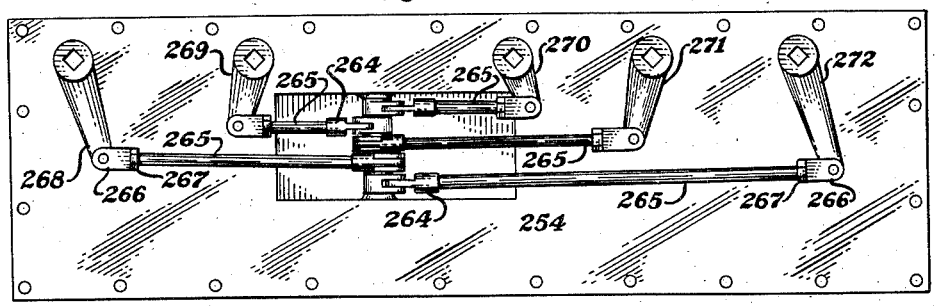
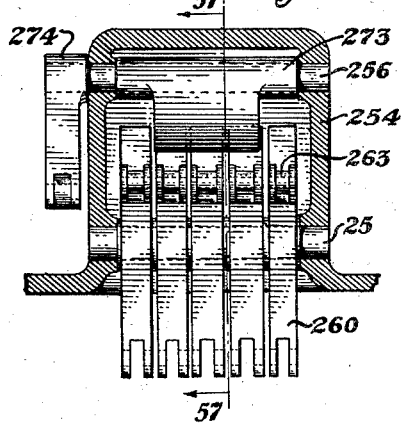
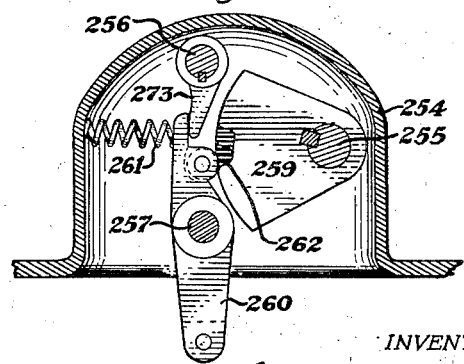
INVENTOR
Matthew Stucatur
BY
A. D. Caesar
ATTORNEY May 11, 1937.　　　M. STUCATUR　　　2,080,067
TRANSMISSION
Filed Jan. 30, 1932　　　17 Sheets-Sheet 14
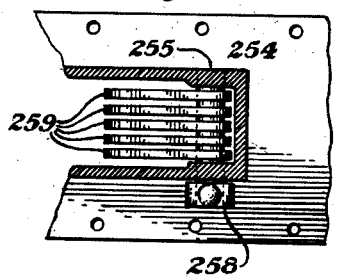
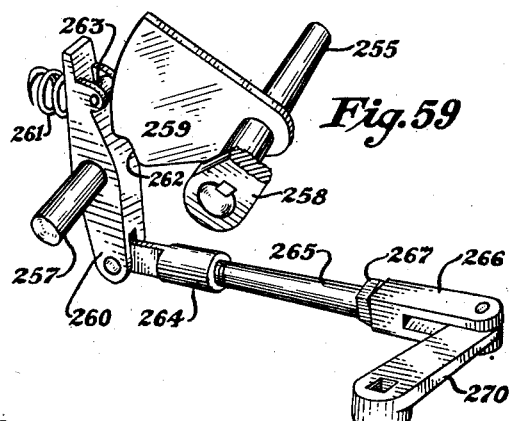
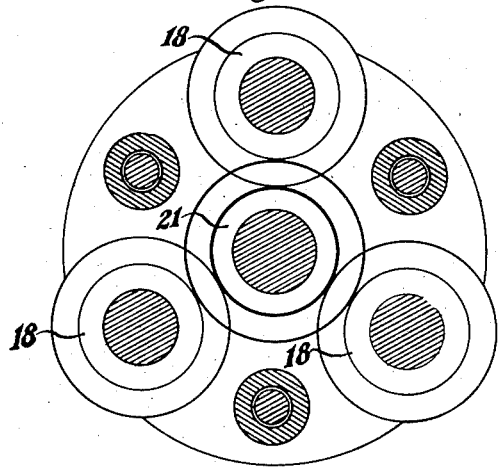
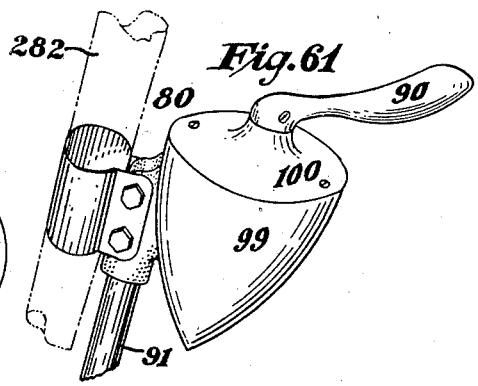
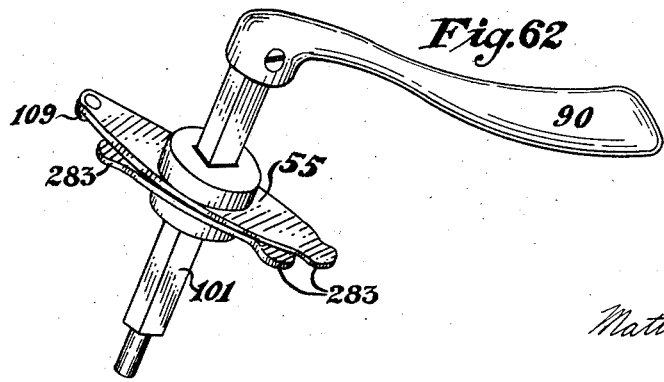
INVENTOR
Matthew Stucatur
BY
A. D. Caesar
ATTORNEY May 11, 1937.  M. STUCATUR  2,080,067
TRANSMISSION
Filed Jan. 30, 1932  17 Sheets-Sheet 15
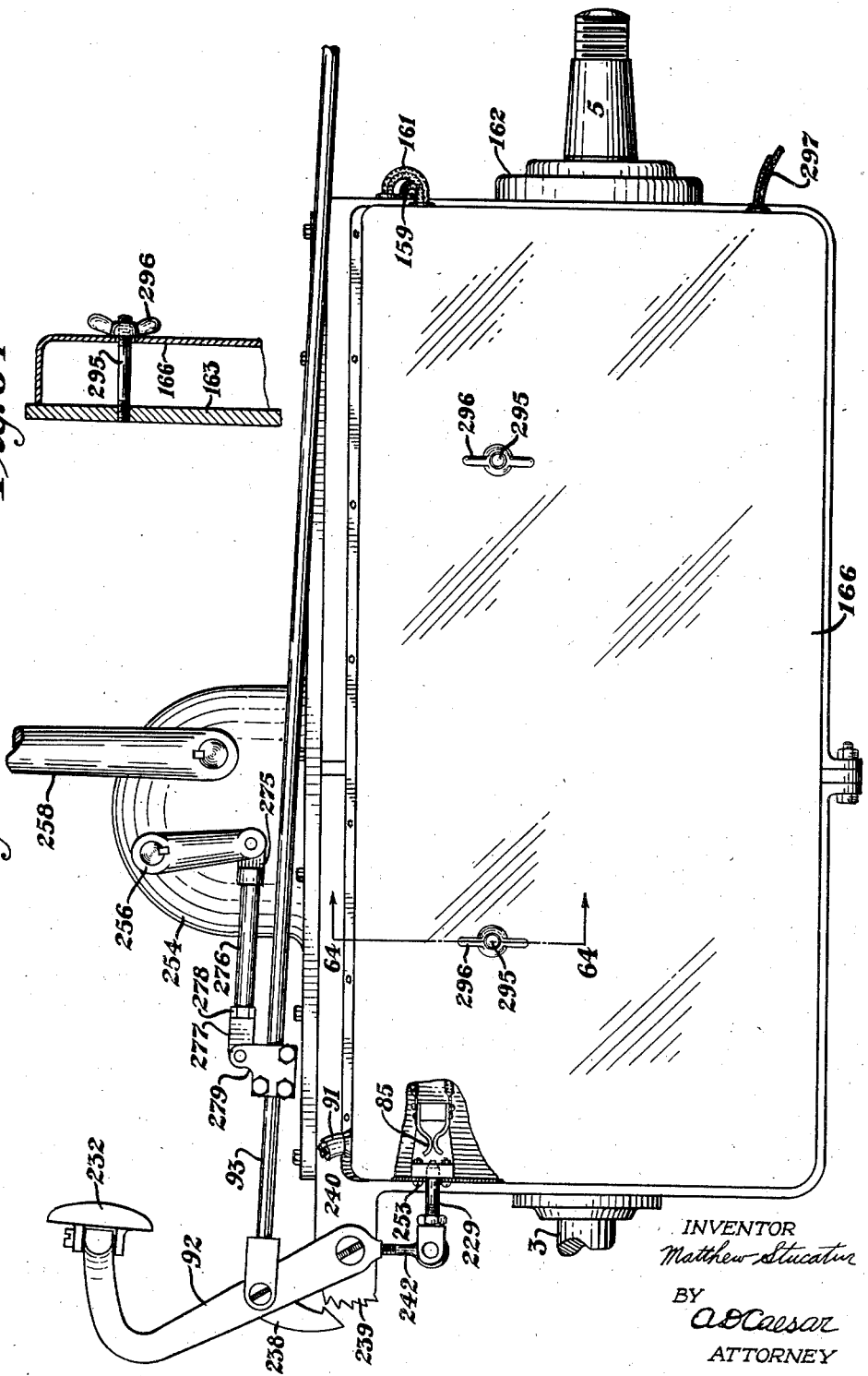

May 11, 1937. M. STUCATUR 2,080,067
TRANSMISSION
Filed Jan. 30, 1932 17 Sheets-Sheet 16

INVENTOR
Matthew Stucatur
BY
A. D. Caesar
ATTORNEY

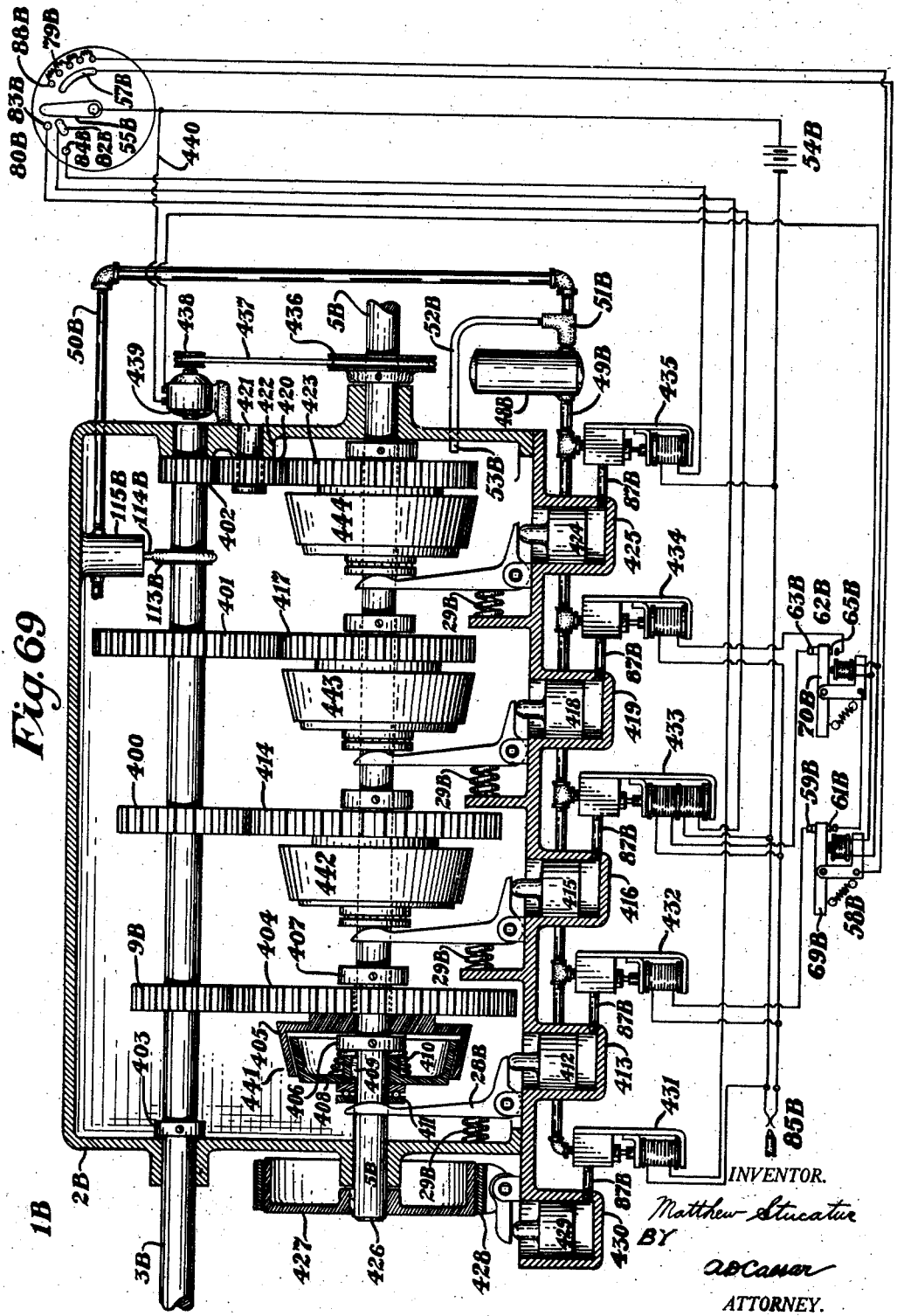

Patented May 11, 1937

2,080,067

UNITED STATES PATENT OFFICE 2,080,067

TRANSMISSION

Matthew Stucatur, Philadelphia, Pa.

Application January 30, 1932, Serial No. 589,892

39 Claims. (Cl. 74—260)

This invention relates to automatic speed change mechanisms and has for its object the production of a new and improved mechanism of this class.

Present change speed mechanisms of the "mechanical" type have the defect of being difficult to control, especially in the larger sizes, but have the advantage of providing a positive efficient connection between the prime mover and its load. Present change speed mechanisms of the "electrical" type provide facility of control, but do not provide a positive connection between the prime mover and its load, and are not as efficient as the mechanical transmissions. It is the object of this invention to provide a transmission combining the advantages and being free from the defects of both the mechanical and electrical transmissions.

More particularly stated, one of the objects of this invention is to produce a mechanism wherein the prime mover will be effectively and automatically connected to a variable load. This device will be particularly useful in conjunction with an internal combustion engine driven motor vehicle, and when used thereon, results in silent operation, in better acceleration, better fuel economy and creates simplified and less laborious operation of the motor vehicle under all conditions liable to arise in motor vehicle operation.

Another object of my invention is to produce a power transmitting mechanism, a portion of which can be used as a brake.

Another object of this invention is to produce an automatic change speed mechanism wherein the operator can at any time modify the action of the otherwise automatic controlling means.

Another object of this invention is to produce a mechanism wherein the lubricating fluid in addition to its normal function serves as an operating medium.

Another object of this invention is to provide means whereby the surplus actuating fluid is delivered to the power transmitting parts for the purpose of lubrication.

Another object of this invention is to provide a mechanism wherein an induction generator acts as a governor.

Another object of this invention is to provide an automatic change speed mechanism which includes, as an element of the combination, a relay which is proof against the jars and vibration ordinarily incurred by the motor vehicle when in use.

Another object of this invention is to produce an automatic change speed mechanism having as an element of the governing mechanism, a frequency and voltage responsive relay.

Another object of this invention is to produce an automatic change speed mechanism wherein actuating fluid is supplied to the actuating mechanism through electrically controlled valves.

Another object of this invention is to produce an automatic change speed mechanism wherein the actuating and connecting members occupy the minimum space for the power transmitted.

Another object of this invention is to provide an automatic transmission having as an element thereof, friction clutches that occupy the minimum possible space.

Another object of this invention is to provide a new and improved brake band for automatic change speed mechanisms.

Another object of this invention is to provide foot controlled operating means whereby the new transmission can be readily driven by anyone familiar with the present day non-automatic drive.

Another object of my invention is to provide electrical governing means consisting of a generator that delivers power in surges and to provide relays operated by the current supplied by the said generator, the said relays being so constructed that they are enabled to take advantage of the hysteresis effect caused by the said surging current.

Another object of my invention is to provide a governor consisting of an alternating current generator and a plurality of relays connected in series and so arranged that the varying impedance of the system caused by the operation of the relays assists in causing progressive action of the said relays.

Another object of my invention is to provide means whereby the operator can control the transmission of power through the transmission from two distinct places.

Another object of my invention is to provide an automatic transmission wherein the change of speeds is affected by a controlling mechanism operated by fluid under pressure, to provide a reservoir of fluid under pressure for the controlling mechanism, and to provide means for maintaining the pressure of fluid in the said reservoir between predetermined limits.

Another object of my invention is to provide in an automatic transmission capable of giving forward and reverse speeds and brake actions, a single control member whereby the operator can control the said speeds and brake action.

Another object of my invention is to so construct an automatic transmission capable of giving forward and reverse speeds and brake action and having a single control member for controlling the said speeds and brake action that it will be necessary at all times to cause application of the brake when changing from a forward to a reverse speed or vice versa.

Another object of my invention is to provide an automatic transmission with readily detachable means whereby it may be operated as a non-automatic transmission when desired.

Another object of my invention is to provide new and improved controlling means for automatic change speed mechanism whereby the operator can at will apply brakes external to this transmission and by further motion of this controlling means neutralize the transmission.

Another object of my invention is to provide an automatic transmission with electrical control means external of and remote from the transmission, whereby the operator can control the said transmission.

Another object of this invention is to produce a mechanism that is automatically self compensating for wear in the portions subject thereto.

Figure 1 is a schematic diagrammatic representation of all the essential components of my invention. This diagram illustrates the electrical, mechanical and hydraulic connections only and is not to be used as a representation of either the exact construction or location of the parts shown.

Figure 2 is a wiring diagram which illustrates the position of the relays when my machine is in its lowest speed.

Figure 3 is a wiring diagram which illustrates the position of relays when my machine is in the second or next to the lowest speed.

Figure 4 is a wiring diagram which illustrates the position of relays when my machine is in the third or next to the high speed.

Figure 8 is a side view partly in section showing various parts of an automobile and my transmission as applied thereto.

Figure 9 is a view, taken in the direction of the arrow 9, of the steering wheel and the controller clamped thereto, shown in Figure 8.

Figure 10 is a section of the controller taken on the line 10—10 of Figure 11.

Figure 11 is a top view of the controller with the cover removed.

Figure 12 is a side view of the detent strip and its accessories shown in Figures 10 and 11.

Figure 13 is an enlarged side view, partly in section, of the spring and case therefor used in conjunction with the brakes and the novel brake lever of the motor vehicle shown in Figure 8.

Figure 14 is a section on the line 14—14 of Figure 15.

Figure 18 is a front view of the panel from which the dust cover has been removed showing the various portions of the controlling mechanisms that are fastened to the panel.

Figure 19 is an enlarged vertical section of a combination check and safety valve used in conjunction with my machine, shown in its assembled position in Figure 18.

Figure 20 is an enlarged section of the cylinder and its adjuncts used for applying the brake-bands in my machine.

Figure 21 is a section taken on the line 21—21 Figure 15.

Figure 22 is a perspective view of the clutch release lever.

Figure 23 is a section of the cylinder used in conjunction with the clutch release shown in Figure 22.

Figure 24 is a vertical cross section of the clutch release lever illustrated in Figure 22.

Figure 25 is a section taken on line 25—25 of Figure 15.

Figure 26 is a perspective view of the transmission brake-band operating mechanism.

Figure 27 is a section of the brake-applying mechanism shown in Figure 26.

Figure 28 is a partial view of two portions of the brake-band shown in perspective.

Figure 29 is a section on the line 29—29 of Figure 30 and represents a portion of the brake-band and the mechanism whereby it is fastened to the case.

Figure 30 is a section on the line 30—30 of Figure 29.

Figure 31 is a perspective view of each of the component elements of the assembly shown in Figure 29.

Figure 32 is a perspective view of the upper cam used in conjunction with the brake-band operating mechanism.

Figure 33 is a perspective view of a relay used in conjunction with the governing mechanism of my device.

Figure 34 is a vertical section of the relay shown in Figure 33. This section is taken along the center line of the core and contacts and best illustrates the construction of these parts.

Figure 35 is a perspective view of an electrically operated valve used in conjunction with the controlling mechanism forming a portion of this device.

Figure 36 is a vertical section of the electrically operated valve shown in Figure 35.

Figure 37 is a vertical section of an electrically operated valve used in conjunction with my device which differs somewhat from the valve illustrated in Figures 35 and 36.

Figure 38 is an enlarged vertical section of one of the clutches shown in Figure 14.

Figure 39 is a front view of the clutch housing shown in Figure 38.

Figure 40 is a front view of the pressure plate which is one of the components of the clutch illustrated in Figure 38.

Figure 41 is a clutch blade, another of the components of the clutch shown in Figure 38.

Figure 42 is another clutch blade, still another of the components of the clutch illustrated in Figure 38.

Figure 43 is an enlarged section along line 43—43 of Figure 42.

Figure 44 is the clutch driving drum, still another of the components of the clutch shown in Figure 38.

Figure 45 is a gear diagram.

Figure 46 is another gear diagram.

Figure 47 is an enlarged side view of the control pedal and its adjuncts shown in its assembled position in Figure 8.

Figure 48 is a side view of the control pedal and its adjuncts shown in Figure 47, taken from the side opposite to that shown in Figure 47.

Figure 49 is a side view partly in section of the joint used for joining various elements of the control pedal illustrated in Figures 47 and 48.

Figure 50 is a top view of the control pedal illustrated in Figures 47 and 48.

Figure 51 is a top view of a master switch in the closed position.

Figure 52 is a side view of the master switch showing the same in its closed position.

Figure 53 is a fragmentary side view of a portion of the master switch illustrated in Figure 52 and shows the relative positions of certain components thereof when the master switch is open.

Figure 54 represents a side view of the emergency operating device used in conjunction with my transmission.

Figure 55 is a bottom view of the emergency operating device shown in Figure 54, with certain portions omitted for the purpose of clearness.

Figure 56 is a section taken on line 56—56 of Figure 54.

Figure 57 is a partial section taken on line 57—57 of Figure 56.

Figure 58 is a fragmentary top view partly in section of a portion of the housing of the emergency operation device and shows the location of the cams.

Figure 59 is a perspective view of one of the cam and lever mechanisms shown in Figures 54, 55, 56 and 57.

Figure 60 is a gear diagram.

Figure 61 is a perspective view of the controller.

Figure 62 is a perspective view of certain component elements of the controller.

Figure 63 is an enlarged side view of the entire transmission with the emergency operating mechanism in place, a portion of the side cover being broken away to show the assembly position of the master switch and its adjuncts.

Figure 64 is a section along the line 64—64 of Figure 63.

Figure 69 is a schematic diagrammatic representation, similar to Figure 1, of still another embodiment of my invention.

Referring more particularly to the drawings wherein similar reference numerals denote similar parts.

Figure 5:
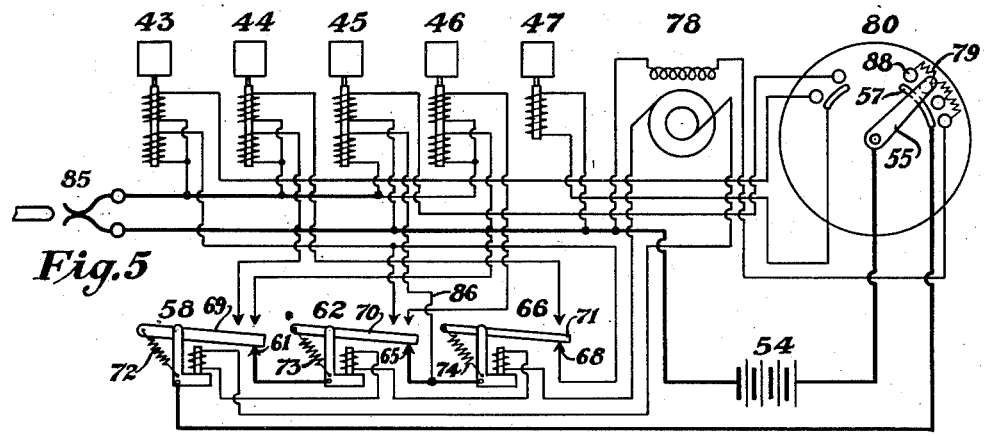
Figure 5 is a wiring diagram which illustrates the position of relays when my machine is in the high speed.

Figure 1 shows my invention diagrammatically. It will be seen from this and the other drawings that my invention can be briefly divided into four more or less distinct classes of mechanism which co-operating, produce the desired results. These mechanisms are:—

(a) The power transmitting mechanism best seen in Figures 1, 14, 15, 25, 38 to 46 inclusive and 60.

(b) Controlling mechanism, best seen in Figures 1, 8 to 13 inclusive, 15, 18 to 32 inclusive, 35, 36, 37, 47 to 53 inclusive, 61, 62 and 63.

(c) Governing mechanism, best seen in Figures 1, 14, 16, 17, 18, 33 and 34.

(d) Emergency operating mechanism, best seen in Figures 54 to 59 inclusive and 63.

I will now describe the schematic structure and operation of the power transmitting, controlling and governing portions of my invention, all of which is schematically illustrated in Figure 1.

*The power transmitting mechanism*

Reference numeral 1 represents my automatic transmission which consists of a case 2 adapted to suitably encase and support certain portions of my automatic transmission and has journaled therein a driving shaft 3, a first driven shaft 4, and a final driven shaft 5.

The driving shaft 3, carries slidably thereon, a portion of a clutch 6, another portion of the said clutch 6 being fast to a frame 7. The frame 7 has journaled therein an orbital shaft 8 and is loosely mounted on the driving shaft 3 and the first driven shaft 4. The driving shaft 3 has fast thereon, a driving gear 9 which latter engages with an orbital gear 10, fast on the said shaft 8. Orbital gear 11 is also fast on the said shaft 8 and engages with a driven gear 12 which is fast on the shaft 4. Said shaft 4 carries slidably thereon a portion of a clutch 13, another portion of the said clutch 13 being fast to a frame 14. The frame 14 has rotatively mounted therein an orbital shaft 15 and is loosely mounted on the shaft 4 and the hub portion 16 of a reverse drum 17 which is loosely mounted on the shaft 5. The orbital shaft 15 has fast thereon orbital gears 18, 19 and 20. The shaft 4 has fast thereon, a driving gear 21. This gear 21 engages with the orbital gear 18. Orbital gear 19 engages with the driven gear 22, which is fast on the shaft 5. Orbital gear 20 engages with the sun gear 23 which is fastened to the reverse drum hub 16. Brake bands 24, 25 and 26 are provided to hold stationary the housings 7 and 14 and the rim 27 of the reverse drum 17.

*Operation of the power transmitting portions*

From the foregoing description it will be seen that when the clutches 6 and 13 are disengaged and the brake bands 24 and 25 hold the frames 7 and 14 stationary, the brake band 26 being released, power can be transmitted from the driving shaft 3 to the first driven shaft 4 through the gears 9, 10, 11 and 12 and from the first driven shaft 4 to the driven shaft 5 through the gears 21, 18, 19 and 22. In this position the ratio of rotation of the shaft 5 to the shaft 3 is determined by the reduction ratio of the gears 9, 10, 11 and 12 and the gears 21, 18, 19 and 22. This is the lowest speed forward obtainable in this transmission.

Releasing brake band 24 and engaging clutch 6 makes it necessary for the shaft 3 and the housing 7 to rotate as a unit. Therefore, shaft 4 must also turn at the same speed as shaft 3. In this position, the portions of the second unit being left as previously described, power can be transmitted from the shafts 3 and 4 rotating as a unit to the shaft 5 by way of gears 21, 18, 19 and 22. In this position the ratio of rotation of the driving shaft 3 to the driven shaft 5 is determined by the ratio of the gears 21, 18, 19 and 22.

Disengaging clutch 6, reapplying brake band 24, engaging clutch 13 and disengaging brake band 25, brake band 26 also being released, results in a different gear ratio. In this position shafts 4 and 5 together with frame 14 rotate as a unit for reasons similar to those set forth in conjunction with the operation of the last speed described. In this position power can be transmitted from the shaft 3 to the shaft 4 and therefore shaft 5 by way of the gears 9, 10, 11 and 12 which latter will determine the reduction ratio.

It will also be seen that by simultaneously causing the application of two conflicting speed ratios on the same unit, brake action will be created. For example:—Engaging brake band 26 and engaging clutch 13 will tend to engage speeds one of which tends to produce forward motion and one of which tends to produce backward motion, as obviously, the machine cannot rotate in two directions at once, brake action is produced and this position constitutes a brake. Although in practice I prefer to use the reverse drum and the clutch on the same unit to produce brake action, it is also possible to obtain brake action by using two forward speeds for example:—Applying the clutch 6 and the brake band 24 simultaneously will lock the first unit.

Engaging brake band 26 and engaging clutch 6, clutch 13 and brake bands 24 and 25 being disengaged, results in epicyclic action of the gears 21, 18, 19, 22, 20 and 23 wherein the frame 14 will rotate in a reverse direction causing gear 19 to drive gear 22 and therefore shaft 5 in a reverse direction to that in which driving shaft 3 is rotating.

Releasing all the brake bands and applying clutches 6 and 13 results in causing the shafts 3, 4 and 5 to rotate simultaneously. This is the "high" or direct drive position.

*Controlling mechanism*

Referring to the drawings and more particularly to Figure 1:—

It will be seen that each of the clutch actuating levers 28 is provided with a spring 29 under compression. This spring 29 is of sufficient strength to overcome the action of the spring 30 and since the lever 28 is pivotally fastened to the case 2 at 31, its other end pressing against anti-friction bearing 32, the springs 29 will normally keep the clutches out of engagement. The brake bands 24, 25 and 26 are also provided with springs 137, 150 and 171, for keeping them disengaged (see Figures 15, 20, 25, 26, 27 and 29).

These springs 137, 150 and 171 are provided specifically for the purpose of keeping the clutches and brake bands which are not in use, disengaged. These springs will hereinafter be more fully described. The clutches can be applied collectively by introducing fluid under pressure simultaneously to cylinders 33 and 34. This would cause pistons 35 and 36 to move outwardly compressing springs 29—29 and enabling springs 30—30 to apply clutches 6 and 13. It is obvious that to apply the clutches 6 and 13 singly and/or successively, it is only necessary to introduce fluid under pressure to the cylinders 33 and 34 respectively either singly or successively. The brake bands can be applied by introducing fluid under pressure to cylinders 37, 38 and 39. This will cause their pistons 40, 41 and 42 to move outwardly and apply the brake bands as will hereinafter be more fully described. These brake bands can be applied singly, successively or simultaneously, similarly to the clutches. Electromagnetically operated three-way valves 43, 44, 45, 46 and 47 control the admission and exhaust of fluid to the cylinders 33, 37, 34, 38 and 39. These valves, which hereinafter will be more fully described, are so constructed that when electrically energized they will permit fluid to flow from the reservoir 48 to their respective cylinders. It will be seen from Figures 1 and 18, that the reservoir 48 is connected by means of pipe line 49 to the electromagnetic valves 43, 44, 45, 46 and 47 and that each of the said electromagnetic valves is connected by a pipe line 87 to the respective cylinder which it controls. When the said valves 43, 44, 45, 46 and 47 are not electrically energized, they are so arranged that the interior of the cylinder, which each of these valves controls is connected to the atmosphere and the pipe line 87 is closed. It will be seen from the foregoing that to engage any clutch or brake band it is necessary to electrically energize the electromagnetically operated valve which controls it.

I preferably use a portion of the same fluid oil which lubricates the transmission as the energizing fluid for the cylinders 33, 37, 34, 38 and 39. This fluid is taken from the bottom of the transmission case 2 by any suitable pump (such as 115 shown in Figure 14), and pumped through the pipe line 50 to reservoir 48. Reservoir 48 is provided with an air cushion at its upper portion, see Figure 21, and has connected thereto a combination check and safety valve 51. This combination check and safety valve, which will hereinafter be more fully described, prevents the return of fluid through the pipe line 50 and provides for the escaping of the fluid through the pipe line 52 in the event that the pressure within the reservoir 48 becomes excessive. This pipe line 52 is provided with openings 53—53 so positioned that fluid, escaping therefrom, is squirted upon the gears and bearings, thus effectively lubricating them.

*Operation of controlling mechanism*

By electrically energizing valves 44 and 46 and not electrically energizing valves 43, 45, and 47, fluid under pressure will be admitted to cylinders 37 and 38 while cylinders 33, 34 and 39 will be left open to the atmosphere. This will result in brake bands 24 and 25 being applied while springs will keep clutches 6 and 13 and brake band 26 released, as has been previously described in conjunction with the description of the operation of the power transmitting mechanism. This position constitutes the lowest forward speed. Similarly electrically energizing valves 43 and 46 only, will result in a different reduction, and energizing valves 44 and 45 only, will result in still another reduction. The electrical energization of valves 45 and 43 only, will result in a straight through drive. The energization of valves 45 and 47 will result in brake action. The energization of valves 43 and 47 only, will result in reverse speed.

*The governing mechanism*

My governing mechanism can be divided into two portions, the automatic portion and the nonautomatic portion but since the automatic portion is more or less under the control of the operator, the exact division point of as to what is automatic and as to what is not automatic is somewhat hard to determine. I will therefore, describe my governing mechanism as a unit. In describing the controlling mechanism, I have described how by electrically energizing certain complementary groups of electromagnetically operated valves, there will result certain speeds or brake effects. My governing mechanism selects and energizes the proper valves.

54 represents a battery or any other source of electricity. One terminal of this battery is electrically connected to the lever 55 of the controller 80. The exact structure of this controller as well as that of certain other parts to be mentioned in my description of the governing mechanism will hereinafter be more fully described.

The lever 55 of the controller is pivoted at 56 and can be swung so as to contact with a contact strip 57. Contact strip 57 is connected to the body portion of the relay 58 which is provided with contacts 59, 60 and 61. Contact 61 connects to the body portion of the relay 62 which is provided with contacts 63, 64 and 65. Contact 65 connects to the body portion of the relay 66 which is provided with contacts 67 and 68. The relays 58, 62 and 66 are provided with armatures 69, 70 and 71 which are kept against their upper contacts by springs 72, 73 and 74. The relays 58, 62 and 66 are also provided with electro-magnets 75, 76 and 77 which when sufficiently energized will attract their respective armatures 69, 70 and 71 thus disconnecting the armatures from their upper contacts 59, 60, 63, 64 and 67 and connecting them to their lower contacts 61, 65 and 68. The relays 58, 62 and 66 are provided with windings and air-gaps that are so arranged that they will operate in the following progression:—58, 62, 66, on increase of current and vice versa on decrease of current. This effect is further enhanced by making the armatures such that the relay 58 will operate at an alternating current of a lower frequency than 62, and 62 will operate at an alternating current of a lower frequency than 66.

The aforementioned electromagnets 75, 76 and 77 are connected in series and are connected to a generator 78. This preferably is an induction generator and consists of two separate coils of wire wound on a single core. One of these coils of wire constitutes the generator coil and is connected to the electromagnets 75, 76 and 77. The other coil constitutes the field coil and has one end thereof connected to the battery 54, the other end being connected to rheostat 79. This rheostat is preferably formed as a portion of the controller 80, and is connected to the battery 54 through the lever 55. When the lever 55 is in the position wherein it contacts with the contact points 88 of the rheostat 79 it also makes contact with the contact strip 57. It can be seen that by sliding the contact lever 55 along the contact strip 57, it will also contact with the contact points 88 and more or less resistance can be inserted into the field of the generator 78 and therefore the induced current in the generator coil of the generator can be controlled. The brake drum 17 constitutes the rotating element of the described induction generator and for this purpose it is made of magnetic material and provided with perforations 81. When the field coil of the generator 78 is energized and the reverse drum 17 rotates as it will when any forward speed is used, the moving of the perforations 81 of the brake drum 17 past the iron core of the generator 78 will vary the magnetism of the said iron core and cause a current to be generated in the generator coil of the generator 78. This current will be of a frequency depending on the speed of rotation on the drum 17, and the number of apertures, 81, contained therein; and will be of an intensity dependent on the speed of the drum 17 and number of apertures 81 of this drum, and on the strength of the primary current flowing through the field coil of the generator 78.

*Control of reverse speed and brake*

Figure 6:
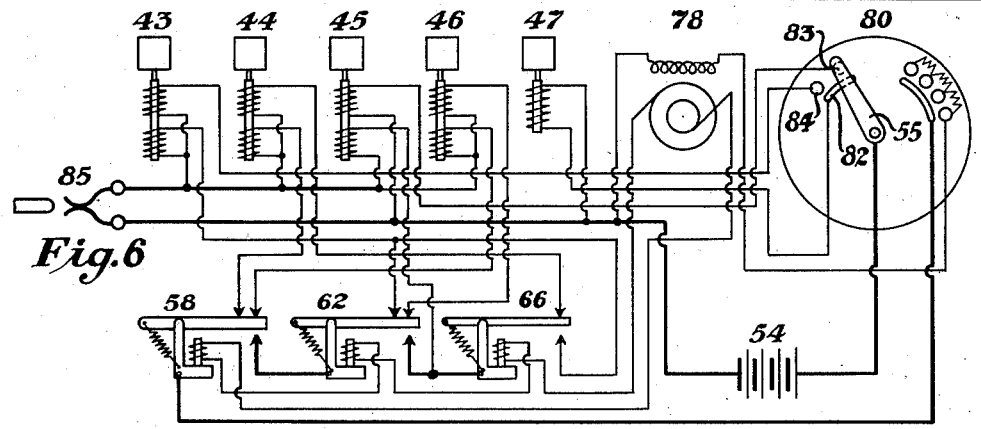
Figure 6 is a wiring diagram which illustrates the position of the controller when my machine is operating as a brake.
Figure 7:
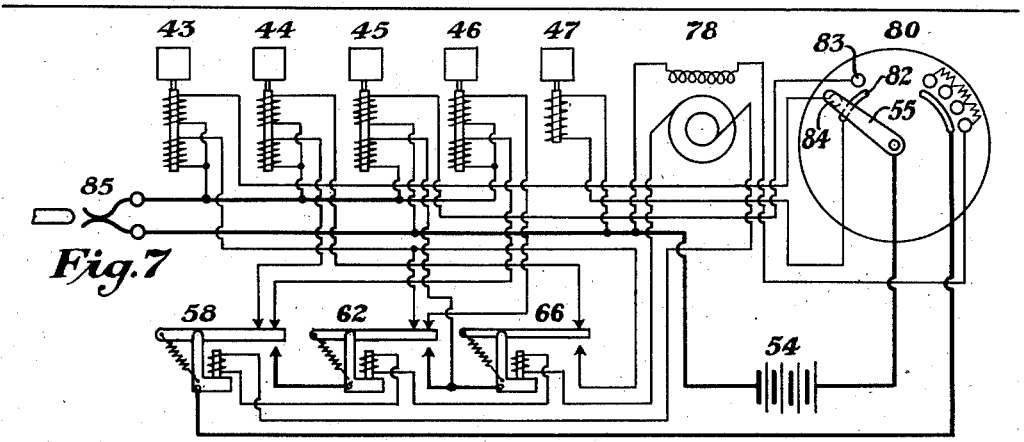
Figure 7 is a wiring diagram which illustrates the position of the controller when my machine is in reverse.

The operator can, by swinging the lever 55 so as to contact with strip 82 and contact 83, cause energization of the valves 47 and 45 and thus produce brake action as has been described, (see diagram Figure 6). He can also, by further swinging the lever 55, cause it to simultaneously contact with strip 82 and contact 84 thus energizing valves 43 and 47 and cause a reverse speed to come into action, as has been described. This is best seen in diagrammatic Figure 7.

*Operation of governing mechanism*

When the operator wishes the vehicle to which this transmission has been fitted, to move forward he manipulates the controller 80, causing the lever 55 to be in a position illustrated in diagrammatic Figure 2. Current from the battery 54 can now travel from the battery 54, to the lever 55, through the strip 57, to the relay 58, through the contacts 59 and 60, to the valves 44 and 46, from the valves 44 and 46, to the master switch 85, and from the master switch 85, back to the battery 54, thus forming a circuit through the valves 44 and 46 which are energized. As has been previously described, energization of these valves 44 and 46 results in the first forward speed. Assuming that the driving shaft 3 is connected to a prime mover in operation, the machine will now move forward at a low speed which the operator can increase by increasing the speed of the prime mover. It will be seen that when the lever 55 is in this position the field coil of the generator 78 is energized and as the machine is moving in a forward position the reverse drum 17 is revolving. As has been described, this will cause a current to be generated in the generator coil of the generator 78 and therefore the electromagnets 75, 76 and 77 will be energized. When the reverse drum 17 is rotating at sufficient speed, the magnetic pull of the coil 75, will be sufficient to overcome the tension of the spring 72 and the armature 69 will be attracted, disconnecting it from contacts 59 and 60 and connecting it to contact 61. These parts will now be as illustrated in diagrammatic Figure 3. In this figure current can flow from the battery 54, to the lever 55, through contact strip 57, to relay 58, through contact 61, to relay 62, through contacts 63 and 64, to electro-magnetic valves 43 and 46, to master switch 85, and from there to battery 54, thus forming a complete circuit and energizing the electromagnetically operated valves 43 and 46. As has been described this constitutes the second speed. A further increase of the rotative speed of the reverse drum 17 will result in an increase of current traveling through the relay circuits and when this has reached sufficient strength, electromagnet 76 will overcome the tension of the spring 73 and attract armature 70. This will disconnect contacts 63 and 64 and connect 65. Conditions will now be as illustrated in diagrammatic Figure 4. In this position current can flow from battery 54 to lever 56 through contact strip 57 to relay 58 through contact 61 to relay 62 through contact 65 to relay 66 and through contact 67 and through line 86 to electromagnetically operated valves 44 and 45 then to master switch 85 and from master switch 85 back to the battery 54 thus forming a circuit and energizing the electromagnetically operated valves 44 and 45. As has been previously described this constitutes the 3rd speed.

A further increase in speed of reverse drum 17 will result in a further increase of current generated by the generator 78 and will cause electromagnet 77 to overcome the tension of the spring 74 and attract the armature 71 disconnecting contact 67 and connecting contact 68. The device will now be as illustrated in diagrammatic Figure 5.

Current can now flow from battery 54, to lever 55, through contact strip 57, to relay 58, through contact 61, to relay 62, through contact 65 to relay 66, through contact 68 and line 86, to electromagnetically operated valves 45 and 43, through master switch 85, back to battery 54. It will be seen that there is a complete circuit through electromagnetically operated valves 43 and 45 which latter are energized and as has been described, the 4th or direct driving speed is now in operation.

It can be seen that during these last four speeds described, the field coil of the generator 78 was energized and that the current, flowing through the electromagnetically operated valves, always flowed in series with the master switch 85. Opening of the master switch 85 would therefore have de-energized these electrically operated valves and would have caused a "neutral" position irrespective of the position of the controller, or the relays. The said master switch 85 is operated by any suitable means such as a pedal (see Figure 63), which will hereinafter be more fully described and enables the operator to bring about a neutral position irrespective of the operation of other portions of this transmission. It will also be seen that the circuit is so arranged that when the combination of valves constituting the brake is energized, opening of the master switch will not disturb its circuits.

It will, of course, be understood that by proper manipulation of the lever 55 of the controller 80, the operator can bring about a neutral or a brake position at any time without using the pedal controlled master switch. Such a neutral position of the controller 80 is illustrated in Figure 1. I therefore provide two distinct ways in which the operator can bring about neutralization of the transmission.

The rheostat 79 is provided for the purpose of enabling the operator to vary the time at which the automatic shifting of speeds will occur. The structure and operation of this rheostat will hereinafter be more fully described.

Figure 67:
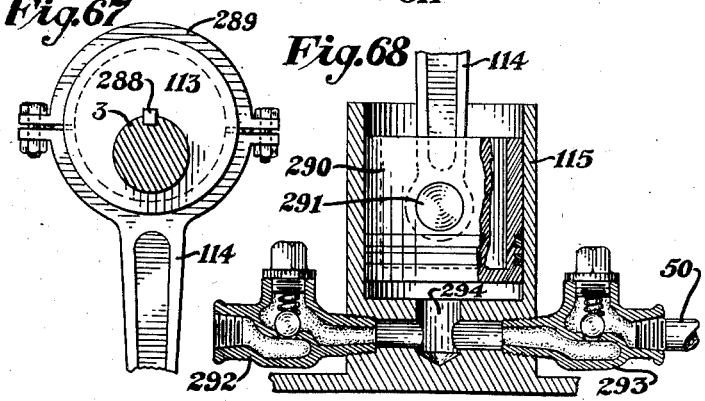
Figure 67 is a section taken along the line 67—67 of Figure 14.
Figure 68:
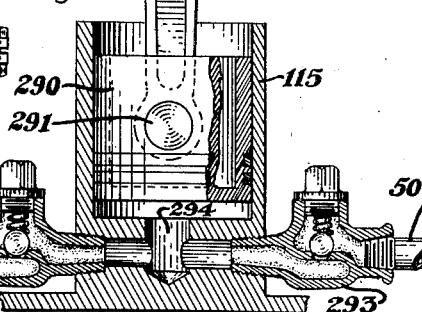
Figure 68 is a section taken along the line 68—68 of Figure 14.

Having described broadly, with the help of diagrams, the arrangement and operation of my transmission, I will now describe a preferred embodiment thereof which is illustrated in my drawings, Figures 8 to 64 inclusive and Figures 67 and 68. In this description I will assign the same numbers to equivalent parts of this transmission as have been shown and described in the diagrammatic drawings and will use numbers greater than 88 for all parts or portions that have not been shown or described previously in this specification.

Detailed Description of the Preferred Embodiment of My Invention

General assembly

Referring particularly to the practical embodiment of my invention as illustrated in the drawings, 89 represents the engine or other prime mover of the motor vehicle to which is operatively connected the driving shaft 3 of my transmission 1, which latter is suitably fastened to the frame members or any other suitable portion, not shown, of the motor vehicle, see Figure 8. The driven shaft 5 of my transmission 1 is operatively connected to the propeller shaft 280 which may be connected in a usual manner to drive the rear wheels 281 of the motor vehicle. The controller 80 is suitably clamped to the steering column 282 of the motor vehicle in such a manner that its lever 90 may be conveniently manipulated by the operator. A conduit 91 connects the controller 80 with the transmission 1. The control pedal 92 is arranged conveniently to the feet of the operator and has connected thereto the brake rod 93 which latter operates brakes on the wheels of the motor vehicle through the intermediary of the resilient coupling 94. This coupling 94 (see Fig. 13) consists of a case 95 that is fast to the brake rod 96 and has therein a spring 97. The brake rod 93 has fast thereon the collar 98. The spring 97 is under initial compression sufficient to apply the said brakes and when these brakes are applied and the brake rod 96 will not move further it is still possible for the brake rod 93 to move further by compressing the spring 97, thus permitting further motion of the control pedal 92, making possible the operation of the master switch 85 as will hereinafter be more particularly described.

The controller

Referring more particularly to Figures 10, 11, 12, 61 and 62, it will be seen that my controller 80 consists of a body 99 that is adapted to be fastened to the steering post 282 of a motor vehicle or to any other object where the controller would be easily accessible by the operator, and is provided with a cover 100. A shaft 101 is loosely mounted in the cover 100 and in a bearing 102 at the lower portion of the body 99. This shaft has fast on its upper end the handle 90, and is squared that it may fit into a square hole in the lever 55 which latter must turn therewith, (see Figure 62). A compression spring 103 encircles the said shaft 101 and presses the aforementioned lever 55 downward against the base 104 which latter is suitably apertured to support the resistance spool 105, and is provided with rheostat contacts 106, contacts 57, 82, 83 and 84, detent strip 107 and feed contact strip 108. The strip 108 is connected to the battery 54. The spool 105 and contacts 106 together constitute the rheostat 79. The lever 55 is made of resilient material and provided with 3 contact tips 283 and a detent 109, (see Figure 62). This detent 109 coacts with a detent strip 107 best seen in Figures 10, 11 and 12. The purpose of this detent is to enable the operator by the sense of touch to determine when he has moved the lever 55 a sufficient distance. It also assures that the lever 55 will not be jarred from its position. The detent strip 107 (see Figure 12) is secured to the controller base 104 by means of screws 110 and 111. The screw 111 is provided with a head 112 cut at an angle and positioned as shown in Figures 11 and 12. This positioning is such that when the blade 55 is put into a position wherein the reverse speed of the transmission is available (see Figure 7) the detent 109 will be upon it. Due to the resiliency of the lever 55 it will be necessary for the operator to hold it in this position and as soon as he will release it, it will return to a neutral position due to detent 109 sliding along the inclined surface of the head 112. This will be found particularly useful since the operator of a motor vehicle may be looking backward when he is driving his car backward and therefore cannot give his full attention to manipulation controls. The controller hereinabove described is the means whereby the operator can control the transmission from a point without the transmission.

Power transmitting portion

Referring to the drawings Figures 14, 15, 25, 38 to 46 inclusive, and 60 and more particularly to Figure 14.

The driving shaft 3 is rotatively mounted in the case 2, and at portions 116 and 117, in the first driven shaft 4. It has rotatively mounted thereon at 218 the clutch housing 7 and has fastened thereto the clutch drum 210, the driving gear 9 and the eccentric 113. It also has loosely and slidably mounted thereon the bearing support 118, upon which is mounted the antifriction bearing 32.

The first driven shaft 4 is suitably journaled in the portion 128 of the case 2 and in the plate 119 and has fast thereon the driven gear 12. It is broached at 122 and has inserted therein the splined portion of the shaft 123 which serves as an extension of the shaft 4. The shaft 123 is loosely mounted in the driven shaft 5 in a manner similar to that of the driving shaft 3 and has the housing 13 rotatively mounted thereon in a manner similar to that in which the housing 7 is mounted on the shaft 3. It also has loosely and slidably mounted thereon a bearing retainer similar to 118 and has also fast thereon the driving gear 21 and a clutch drum similar to 210.

The driving gear 9 engages with a gear 10 that is fast on the shaft 8. The shaft 8 is journaled in the housing 7 and in the plate 119 and also has fast thereon the gear 11 that engages with the driven gear 12.

The driving gear 21 engages with the gear 18 that is fast on the shaft 15. This shaft is journaled in the clutch housing 14 and in the plate 296 and also has fast thereon the gears 19 and 20 which respectively engage with the driven gear 22 and the reverse sun gear 23. The reverse sun gear 23 is rotatively mounted on the driven shaft 5 and is provided with a hub portion 16 and a flange portion 27. The plate 296 is rotatively mounted on the hub portion 16 and the brake band 26 is positioned so that it can be caused to grip the flange portion 27.

The plates 119 and 296 are respectively fastened to the clutch housings 7 and 14 by tie bolts 120 and spacers 121.

The driven shaft 5 is loosely mounted in the reverse drum 17 and is suitably journaled at 124 in the case 2. The case 2 is provided with removable covers 125 and 126, and to facilitate assembly of the described power transmitting portions, is preferably made up of three portions 127, 128 and 129. The clutch housings 7 and 13 have associated therewith the brake bands 24 and 25.

The brake bands

Figure 15:
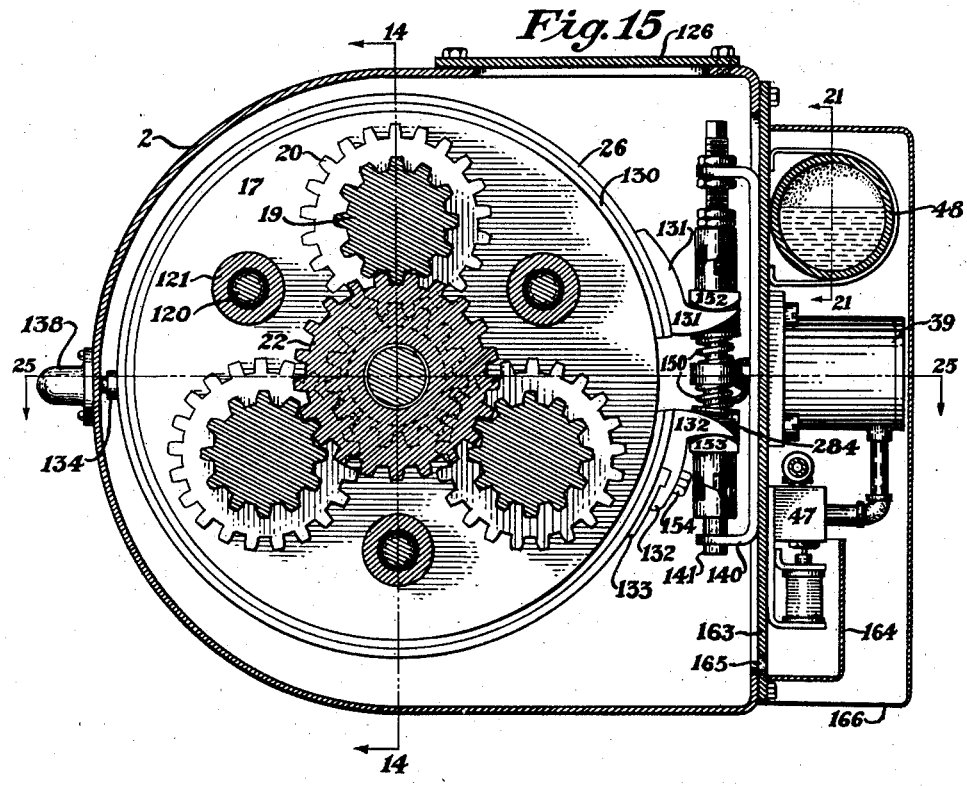
Figure 15 is a section taken on the line 15—15 of Figure 14.

Referring to Figures 15, 25, 26, 27, 28, 29, 30, 31 and 32, the brake bands 24, 25 and 26 are identical in construction. The brake band 26 is shown in Figure 15. As it is best illustrated I will describe this one in detail.

The brake band 26 is provided with a renewable lining 130 and with ears 131 and 132. The first mentioned of these ears 131 (see Figures 15 and 28) is permanently fastened to the brake band 26. The latter of these ears 132 is bolted to a piece 133 which is permanently fastened to the brake band 26. The brake band 26 has fastened to it at substantially its center an internally threaded member 134 (see Figure 29) which has screwed therein a bolt 135. The case 2 has fastened thereto a bushing 136 which is pierced and properly supports the bolt 135. The bolt 135 is encircled by a spring 137 and is prevented from unscrewing by means of the cover 138 which fits slidably over the head of the bolt 135 (see Figure 30) and is fastened to the case 2 by means of screws 139. The support 140 (see Figures 15, 26, 27) is fastened to the panel 163 and has journaled therein the brake operating shaft 141 and the hub portions of the adjusting nuts 142 and 143. This brake operating shaft has its upper portion squared to provide for installation of the emergency operating device, is threaded at 144 to provide for adjusting nuts 142 and 143 and lock nuts 145, is provided with a key at 146 for the purpose of turning the cam 147 and has fastened thereto a cam 148 and an operating lever 149. The compression springs 150 encircle the shaft 141 and press against washers 151. Their function will hereinafter be described. The cams 152 and 153 are loosely mounted on the said shaft 141 and are provided with extending portions 284 that fit into slots 285 of the ears 131 and 132 and therefore cannot turn. Referring more particularly to Figure 15, where the brake band unit 26 is shown in the closed position, it will be seen when the brake operating shaft and its adjuncts are assembled to the brake band the cams 152 and 153 are against the ears 131, 132 and the washers 151 press against the opposite sides of the ears 131 and 132.

It will also be seen that the springs 150 by pressing against the washers 151 always tend to keep the brake band 26 in its disengaged position, and the spring 137 by pulling against the bolt 135 always tends to keep the brake band 26 away from the brake drum evenly. In going from the open position of the brake band to the closed position of the brake band it is necessary to turn the operating lever 149 which results in turning the cams 147 and 148 in respect to cams 152 and 153. This results in the application of the brake band 26 and the compression of the springs 150 and 137. Referring more particularly to Figures 26, 27 and 32 it will be seen that the upper cam 147 is provided with a key way 295 engaging the aforementioned key 146. By the aid of lock nuts 145 it is possible to adjust the cam 147 and lock it in its correct position. In this way wear of all parts can be taken up. To insure the brake band tightening evenly all around it may be adjusted in the following manner: Remove screws 139 and cover 138. Remove bolt 135. Turn the operating lever 149 until brake band 26 has been applied. Adjust the proper degree of application of brake band 26 by check nuts 145. Loosen adjusting nuts 142 and 143 and turn upper adjusting nut 142 until threaded hole in member 134 is opposite hole in bushing 136, lock adjusting nuts 142 and 143 in position. Reinsert bolt 135 and reapply cover 138. From the above description it will be seen that my brake bands can readily be adjusted while assembled. By removing the panel 163 the bolt 135 and the ear 132 which latter is held in place by fastening devices 154, brake band 26 can be readily removed from the machine for relining.

A common trouble with transmissions using brake bands is heating. This may be caused by either the brake band dragging on the drum or in those transmissions in which the brake band runs in oil, oil friction caused by too small clearance between the brake band and the brake drum. There are two usual methods of applying brake bands. The first is that in which the applying mechanism has a motion that is a fixed ratio to the motion of the brake band. The second method uses toggle mechanism or like, the ratio is constantly changing as the brake band is applied.

The first mentioned of these methods is subject to the objections that too much energy is consumed in applying the brake bands or that there is too great a throw of the brake applying mechanism, or both.

The second mentioned of these methods has a very serious objection in that the force applied between the brake band and the brake drum increases as the brake band and other parts wear. For practical reasons it is necessary that sufficient clearance is provided between the brake band and the brake drum and it is also necessary that the power required to operate the brake band is as small as possible and that this power should exert a constant pressure between the brake band and the brake drum even though considerable wear of these and other parts has occurred. The maintenance of proper clearance between the brake band and the brake drum, thus preventing the generation of heat and the thinning of the oil, is not only important for the proper operation and endurance of the brake band and brake drum, but is also necessary to prevent other portions of the transmission from being noisy and from wearing due to thinning of the oil caused by heating of the brake bands.

In my transmission this difficulty is overcome as follows: Referring to the drawings and more particularly to Figure 32, it will be seen that I construct my cams with two different angles of face. The first is a steep angle 155 which causes a relatively large motion of the brake band, and the second is a comparatively gradual angle 156 which causes forcible application of the brake band. Due to this novel construction, it is possible for me to have a large gap between the brake band and its drum in its disengaged position and still be able to rapidly and with comparatively little power to bring the brake band into contact with the brake drum when applying the brake, due to action of the face 155, and due to the action of the face 156 to be able to forcibly apply the brake band. Thus I obtain all the advantages of keeping the brake band away from the drum in the disengaged position without any of the usual disadvantages.

The generator

Figure 16:
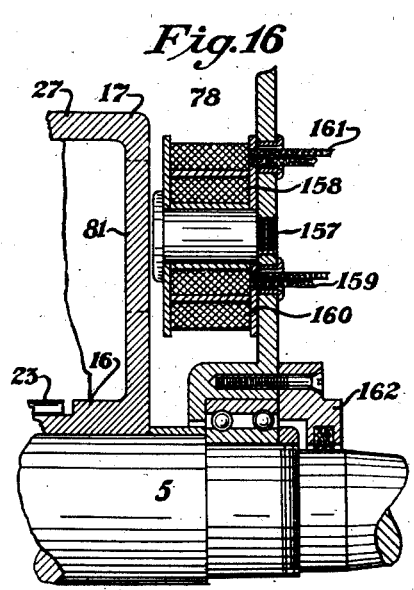
Figure 16 is an enlarged section of certain portions of my machine shown in Figure 14, which cooperate to produce generator action which varies with the speed of the machine, thus constituting a governor.
Figure 17:
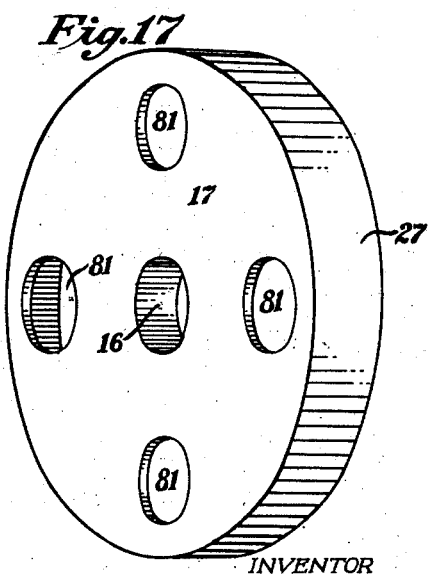
Figure 17 is a perspective view of the reverse drum.

Referring to Figures 1, 14, 16 and 17 and more particularly to Figures 16 and 17 it will be seen that the core 157 is provided with an energizing coil 158 that is provided with leads 159, and a generator coil 160 which is provided with leads 161. The reverse drum 17 is provided with apertures 81 and is so positioned that it revolves near to, but not touching, the face of the core 157 which is stationary. It is to be understood that the core 157, the drum 17, the case 2, the packing retainer 162, and the shaft 5 are made of materials that can be magnetized.

It will be seen from the foregoing that energizing the coil 158 and revolving the brake drum 17 will cause the magnetism in core 157 to vary as the apertures 81 of the drum 17 pass it. When this occurs an alternating current will be generated in coil 160. The strength and frequency of this current depends on the strength of the energizing current sent through coil 160 and the speed of rotation and number of apertures 81 in the brake drum 17. It will be seen that the strength of the current generated in coil 160 can be varied by varying the energizing current sent through the coil 158, but that the frequency can only be varied by varying the speed of the drum 17 or by changing the number of holes 81 in the drum 17 which of course can only be done at the time the machine is built. It is to be noted that I preferably construct drum 17 in such a manner that the magnetic gaps caused by the size and location of the holes 81 and the closed magnetic circuit caused by the portion of the drum 17 that is not apertured are unequal. This causes the generator to generate current in surges. As the speed of the drum 17 increases and the surges are oftener and the hysteresis of the iron makes itself more evident, the current generated is more regular and therefore better able to activate the relays. It will be seen that this generator therefore gives current which is more effective as the speed increases, due to it being smoother. Persons skilled in the generator art will recognize in this construction an alternating current generator of the induction type, but however it is to be understood that my invention is not limited to this type of generator. This generator together with the hereinafter described relays will hereinafter be designated as an electrical governor. An electrical governor is a governor that consists of a portion that creates a current that varies with changing conditions, such as a current in which the voltage varies with the speed of the driven shaft, and a portion, such as the relays, that is sensitive to variations in current and in accordance therewith controls brake bands, clutches or the like.

The panel

Referring more particularly to Figures 15, 18, 25 and 64, it will be seen that for the purpose of facilitating manufacture, assembly, repair and adjustment, I group certain portions of my control mechanism and certain portions of my governing mechanism on a panel. This panel 163 (see Figure 18) which is readily detachable from the rest of the transmission has fastened thereto on its outer side relays 58, 62 and 66, reservoir 48, cylinders 33, 37, 34, 38 and 39, electromagnetically operated valves 43, 44, 45, 46 and 47, check and relief valve 51 and also pipe lines 50, 87, 49 and 52. It also carries necessary wiring which I have omitted from the drawings for the sake of simplicity. This wiring can be readily determined from diagrams, Figures 1 to 7 inclusive. The panel 163 has fastened thereto a tray 164 the function of which is to collect all oil escaping from the electro magnetically operated valves and return same to the case 1 by way of the aperture 165. A dust proof cover 166 best seen in Figures 15, 25, 63 and 64 are provided to protect all instruments on the outside portion of the panel. Since the clutch operating mechanism and the brake operating mechanisms are carried by supports fastened to the panel, (see Figures 15 and 25) removal of the panel results in removal of these portions. Therefore when the panel is removed the power transmitting portions can be gotten at readily, for repair and the like. The cover 166 is fastened to the panel 163 by means of studs 295 and thumb nuts 296, see Figures 63 and 64.

Operating cylinders

I used two forms of operating cylinders in conjunction with my present transmission. These are best seen in Figures 15, 20, 23 and 25. The one illustrated in Figure 23 is used for operating a clutch release lever such as 28. It consists of a cylinder 33 that is flanged at 167 for fastening to the panel 163, is provided with a piston 35, and has fastened thereto a pipe line 87. The piston 35 is provided with a leather 168 to prevent leakage of fluid.

The cylinder 37 and piston 40 illustrated in Figure 20 is for the purpose of controlling a brake band such as 24 and differs from the one described in that the piston 40 is provided with a release rod 169 fastened thereto and further in that it has fastened thereto a screw eye 170 which is provided with a tension spring 171 which in turn is secured to a screw eye 172. This screw eye 172 is fastened to the cylinder head 173 which in turn is fastened to the cylinder 37. A pipe line 87 provides for the flow of fluid to or from the cylinder 37. The parts 169 to 172 inclusive are provided for the purpose of facilitating the release of the brake bands. (See Figure 25.) The cylinder head 173 is made removable for the purpose of facilitating assembly of the cylinder 37 and its adjuncts which would otherwise be difficult because of the spring 171.

The pump

Every time speeds are changed fluid is drawn from the reservoir 48, therefore it is necessary to replenish its supply of fluid. This is done by the pump 115, (best seen in Figures 14, 67 and 68). Referring to the drawings: The eccentric 113 is fast on the driving shaft 3 and has rotatively mounted thereon the connecting rod 114. This rod is provided with a cap 289 at its upper portion and a wrist pin 291 at its lower portion. This wrist pin 291 is rotatively mounted in the connecting rod 114 and is fast in the piston 290. This piston is of conventional design and is slidably mounted in the cylinder of the pump 115. This cylinder is preferably cast integral with the case 2 and is provided with a port 294 that communicates with the ball check valves 292 and 293, which are of conventional design. The ball check valve 293 communicates with the pipe line 50 and permits the flow of fluid from the pump 115 to the reservoir 48 and prevents return of fluid from the reservoir to the pump. The ball check valve 292 permits the pump 115 to draw fluid from the bottom of the case 2 and prevents flow of fluid from the pump to the case. It is to be understood that the open end of the ball check valve 292 is always below the oil line.

The check and relief valve

Figure 19 illustrates my novel construction and arrangement of an automatic check and relief valve 51 wherein a body portion 174 has inserted therein a pipe line 50 which communicates with the pump 115 (see Figure 14), a pipe line 49 which communicates with the reservoir 48 (see Figures 18 and 21), a pipe line 52 which has extensions 53 through the panel 163 which are suitably located to effectively lubricate certain portions of the transmission (see Figure 25). The body 174 is provided with valve seats 175 and 176 which have co-acting therewith check valves 177 and 178. These valves are respectively provided with springs 179 and 180. The spring 179 is stronger than the spring 180 and due to this and the other described features of this automatic check and relief valve it operates as follows:

Fluid entering from the pump by way of a pipe line 50 opens valve 178 sooner than valve 177 due to the spring 180 being of lower tension than spring 179 and fluid is therefore pumped into the reservoir 48 by means of pipe 49. When the reservoir has sufficient fluid therein the pressure rises to such a point that the force of the spring 180 plus the pressure from the reservoir 48 at the back of the valve 178 will be greater than the pressure of the spring 179. Valve 178 will now stay closed and valve 177 will open and permit fluid supplied by the pump 115 to escape by way of pipe line 52 through openings 53 and lubricate the transmission. Due to this structure the pressure in the reservoir is substantially constant. The term "substantially constant" as used in the claims and specifications is used to denote a pressure which will not vary more than 15% from the ideal working pressure, and is so maintained during the operation of the prime mover, irrespective of the speed of the motor vehicle.

The relay

Figures 33 and 34 illustrate a preferred form of relay 58 used in conjunction with my invention. Fastened to a base 190 is a body portion 191. This body portion has pivotally fastened thereto a bar 69 which is provided with contacts 59, 60 and 61, and with a tension spring 72. The body portion 191 has fastened thereto a core 192 which has wound thereon a coil 193. Posts 194 are fastened to the said base 190 and are provided with contact screws 195 for adjusting the contacts 59, 60 and 61. It will be seen that by adjusting the contact screws 195 it is possible to adjust the air-gap and thus adjust the relay. It will also be seen that the bar 69 is supported near or at its center of gravity. This contributes to reliable relay action when the relay is subject to jars, jolts and the like. The bar 69 can be made of different weights and the spring 72 of different strengths and in this way this relay can be made to respond more readily to different frequencies of alternating or intermittent current.

I preferably mount the relays on the panel 163 (see Figure 18). But in all cases the bar 69 must be mounted at or near its center of gravity, this being one of the many novel features of my invention, since it insures the reliable operation of the relays and therefore the transmission under all road conditions.

The electrically operated valve

This mechanism of which I used two types 43, 44, 45 and 46 being of one type, best seen in Figures 35 and 36, and valve 47 being of another type, see Figure 37. The valve 47 consists of a body 196 wherein is mounted a valve 197 which is encircled by a compression spring 198 and is provided with an extending portion 181 against which the said spring 198 presses. The body 196 is threaded at its lower portion and has screwed therein a valve seat 199. The compression spring 198 normally forces the valve 197 against its upper seat 200 as shown in Figure 36. The valve 197 is provided with an extending portion 201 and has fast thereon a core 202. This core extends into a spool 203 which latter is provided with a pole piece 204. The spool 203 may be provided with a single coil of wire 207 as illustrated in Figure 37, or more than one coil of wire 208 as illustrated in Figure 36. A support portion 205 is provided and has riveted thereto a portion 206 with which it serves to complete the return magnetic circuit for the core 202 and the pole piece 204. When the coil 207 (Figure 37) is energized or when either or both of the coils 208 (Figure 36) are energized, the core 202 is attracted to the pole piece 204 and the valve 197 assumes the position as illustrated in Figure 37 wherein it is against its lower seat 199. Assuming the pipe line 49 is connected to the reservoir 48 and that the pipe line 87 is connected to one of the described operating cylinders, it will be seen that when the valve 197 is in the position illustrated in Figure 37, fluid from the reservoir 48 can flow to the said cylinder and cannot escape to the air due to valve 197 being against valve seat 199. When the coil is not energized the spring 198 will force the valve 199 against the valve seat 200 and in this position fluid from reservoir 48 is shut off and fluid in the cylinder can escape by way of aperture 209. I preferably mount these valves by fastening them to the panel 163 with screws 182 and 183. The said screws also serve to fasten the body 196 in place. A screw 184 holds the pole piece 204 in place and a lock nut 185 retains the core 202 in its correct position on the valve stem 201.

In my present invention I show two types of electrically operated valves. The type hereinabove described has one coil and is shown in Figure 37. The second type illustrated in Figures 35 and 36 has two coils; otherwise this two coil type is the same as the single coil valve hereinabove described. By employing a two coil valve it becomes possible to operate it on either two separate circuits or on two separate portions of the same circuit. A person skilled in this art will readily see the advantages gained by this feature by referring to Figures 1 to 7 inclusive and other portions of the drawings and specification. If necessary, more than two coils may be wound on the bobbin of the electro-magnetically operated valve and thus the valve can be controlled by more than two circuits. In the present instance two coils are sufficient.

The clutches

Referring to Figures 38 to 44 inclusive and more particularly to Figure 38 it will be seen that my clutch 6 consists of a clutch drum 210, a pressure plate 211, screws 212 with special heads 286 and springs 30. The clutch blades 214 are slidably mounted on the said clutch drum 210 (see Figures 41 and 44) and the clutch blades 215 are slidably mounted in the clutch housing 216 (see Figures 39 and 42). This housing constitutes a portion of the orbital frame 7 and is provided with anti-friction bearings 217 and bushing 218 for the purpose of supporting the shafts 8 and 3 (see Figures 38 and 14). The springs 30 are under sufficient compression to press the clutch blades 214 and 215, which are alternately mounted as shown in Figure 38, together between the clutch drum 210 and the pressure plate 211, with sufficient force that they may transmit the power required.

Referring more particularly to Figures 14 and 25, it will be seen that the anti-friction thrust bearing 32 fits into the recessed portions of the heads 286 of the screws 212 and enables pressure from the compression spring 29 through the lever 28 to release the clutch by compressing the springs 30, moving the pressure plate 211 and thus permitting the clutch blades 214 and 215 to separate. The action of the operating cylinder 33 in compressing the springs 29 and permitting the springs 30 to apply the clutch has already been herein described. The construction of the clutch housing 216 can best be seen in Figure 39. The extensions 186 fit slidably into the notches 187 of the blades 215. The construction of the drum 210 can best be seen in Figure 44. Projections 188 of the clutch blade 214 fit slidably into the slots 189 of the drum 210. The construction of the blade 214 can best be seen in Figure 41.

Figure 42 illustrates the clutch driven blade 215. This blade is provided with facings 213 fastened to the blade 215. (See more particularly Figure 43.) The clutch 13 is identical with the clutch 6 just described.

The clutch release lever

The construction of the clutch release lever 28 is best seen in Figure 22. The lever 28 has fast thereto a squared shaft 219 that is loosely mounted in the support 220 and extends upward to provide for application of the emergency operating device. The support 220 is fastened to the panel 163 (see Figure 25). The lever 28 is provided with an extending portion 221 adapted to be acted upon by the piston 35, and is apertured at 222. The bolt 223 is slidably mounted in the aperture 222 and is encircled by the compression spring 29 and washers 224. Nuts 225 limit the motion of the spring 29. The lever 28 is bifurcated at 287 and co-acts with the anti-friction bearing 32.

The master switch

Figures 51, 52, 53 and 63 illustrate the construction and operation of a master switch 85 which I at present prefer. This switch consists of a base 226 made of an insulating material to which are fastened springs 227. These springs normally contact at 228 and have connected thereto lead wires. The plunger 229 is made of insulating material and has adjustably fastened thereon a coupling 230 which may be locked in its correct position on the plunger 229 by means of lock nut 231. In practice I preferably fasten the base 226 to the cover 166 of the panel 163 by means of screws 253. The aforementioned cover 166 is suitably apertured to permit insertion of the plunger 229. The coupling 230 is actuated by the screw eye 242 of the control pedal 92 and these parts are so arranged (see Figure 63) that when the control pedal 92 is depressed to a proper degree it will force plunger 229 between the springs 227 as illustrated in Figure 53 thus breaking contact 228 and opening the master switch 85.

The control pedal

Figures 47, 48, 49, 50 and 63 show the construction of control pedal 92. It will be seen from these figures that my control pedal 92 consists of a foot plate 232 pivotally fastened at 233 to a lever 234 that is provided with extensions 235 and 236 which limit the rocking action of the foot plate 232 (see Figure 50). This lever 234 is pivotally fastened at 241 to the extending portion 240 of the case 2, and has pivotally fastened thereto at 237 a brake rod 93 and a pawl 238. The pawl 238 co-acts with ratchet teeth 239 cut into the extending portion 240 of the case 2. The lever 234 is also provided with a screw eye 242. The aforementioned pawl 238 is provided with an extending portion 243 having fast thereon a ball and socket joint 244, wherein is inserted a rod 245 that extends into a similar ball and socket joint 246. This last referred to ball and socket joint 246 preferably is constructed as illustrated in Figure 49. The extending portion 247 of the foot plate 232 has screwed thereon a member 248. Rod 245 is fast to ball 249 and a compression spring 250 is inserted between the ball 249 and the portion 247. The aforementioned joint 244 is of similar construction.

Due to this novel construction of my control pedal it operates as follows and has the following advantages:

It is to be understood that the foot plate 232 is as wide as both the clutch and the brake pedals used on the control system now standard on motor vehicles so that the operator can simultaneously use both feet upon it. When the operator depresses his right foot as he ordinarily does when he wishes to apply the brake he presses upon the portion 251 of foot plate 232. When he does this springs 250 are compressed and in addition as the pawl 238 rides over the top of the ratchet teeth 239 it results in further compressing springs 250. It being understood that the stop 236 is of the proper size to prevent excess compression of spring 250 when pawl 238 is on the top of one of the said ratchet teeth 239. If the operator now removes his right foot, the pawl 238 will be in engagement with one of the said teeth 239 and the pedal 92 will not rise. Therefore the brake operated by the brake rod 93 and the master switch 85 operated by screw eye 242 will remain in a position wherein the car is in neutral and the brakes are applied. By depressing the pedal 92, the operator has, through the rod 93, compressed springs (not shown) included in the brakes controlled by the rod 93. These springs tend to return the pedal 92 to its original position.

If the operator wishes to release the brakes and re-engage the driving mechanism (see Figure 63), he presses downward on the portion 252 of the foot plate 232 with his left foot. In this position the portions 248 will pull against the balls 249 and by means of rod 245 and the extending portion 243 of the pawl, will disengage the pawl 238 from the ratchet teeth 239 and upon the operator raising his left foot the pedal 92 will rise in a manner similar to engaging of a clutch of a standard automobile drive. It will be seen from the foregoing that a man familiar with the standard drive would have no difficulty in driving a car fitted with my drive. In an emergency it is necessary for him to press down with his right foot or break foot on both my drive and on the standard drive. It will therefore be seen that he cannot possible get rattled in an emergency and cause an accident when driving a car equipped with my drive after being accustomed to driving a standard car. This pedal does not have to be used since full control can be had by means of the controller. I preferably adjust the plunger 229 of the master switch 85, so that it is possible for the operator to apply the brake controlled by the rod 93 before the master switch 85 is actuated.

*Emergency controlling mechanism*

Figures 54, 55, 56, 57, 58, 59 and 63 illustrate an emergency operating mechanism which can be used in conjunction with my machine. It consists of a case 254 wherein is pivotally supported a manually operated shaft 255 and a rocker arm shaft 256. The lever shaft 257 is fixedly supported in the said case 254. The manually operated shaft has fast thereon a handle 258 which is located so as to be conveniently operated by the operator. Cams 259 are located in the interior of case 254 and are fast on the aforementioned shaft 255 (see Figures 57 and 59). These cams are provided with delves 262 properly located to give the desired results as will hereinafter be described and co-act with the rocker levers 260, that are each provided with a compression spring 261 which tends to keep them in a position wherein the rollers 263 are forced into the delves 262 of the cams 259 when any of the said cams are in a position wherein the delves 262 are opposite the rollers 263. The levers 260 are each provided at their lower ends with couplings 264 each of which is fastened to a rod 265.

These rods 265 are provided at their opposite ends with couplings 266 and check nuts 267. Levers 268, 269, 270, 271 and 272 are each pivotally fastened to one of the said couplings 266. The rocker shaft 256 (see Figures 56 and 57) has fast thereon a finger 273 and a lever 274 which is provided with a coupling 275, a rod 276, a coupling 277, a check nut 278 and a block 279 which is pivotally fastened to the said coupling 277 and clamped to the brake operating rod 93.

The emergency operating device is intended to be used as an accessory and therefore its case 254 is made to interchange with the transmission covers 125 and 126. As has been described the shafts 219 and 141 of the clutch release levers and of the brake operating mechanisms are squared so that the levers 268 to 272 inclusive can be applied thereto.

When applied to a transmission this device operates as follows:

The operator by moving the handle 258 turns the shaft 255 and therefore the cams 259 each of which is provided with delves 262 properly located to permit springs 261 to force the proper combination of levers 260 into a position wherein they, through the rods 265, couplings 264 and 266 and certain of the levers 268 to 272 inclusive, cause some of the described brake bands and clutches to be applied thus resulting in a forward or a reverse speed or brake application. The cams 259 may be provided with sufficient delves to enable utilization of all the possible speed or brake combinations possible in the transmission or it can be so constructed that only some of possible combinations are used. The lever 258 may if desired be provided with an indicator of any desired type whereby the speed engaged is indicated.

When the pedal 92 is depressed the rod 93 (see Figures 47, 63 and 54) moves forward pulling on block 279 and therefore coupling 277, rod 276 and coupling 275. This causes lever 274 and therefore shaft 256 and finger 273 to turn.

Referring more particularly to Figures 56 and 57 it will be seen that turning of the finger 273 will result in lifting certain of the levers 260 out of the delves 262 should they be therein, and will prevent them from entering these delves if they have not yet entered. As has been described when the roller portions of the levers are not in the delves the clutches or brake bands they control are not engaged. This finger and its adjuncts therefore serves two purposes. (1) It enables the operator, by depressing the pedal 92, then manipulating the lever 258 and then releasing the pedal 92, to selectively engage the desired speed. (2) It enables the operator, by depressing the pedal 92, to disengage speeds applied regardless of the position of the lever 258.

I preferably arrange the delves 262 on the cams 259 that by not using the pedal 92 and moving the lever 258 from its extreme backward to its extreme forward position the "speeds" are brought into action in the following progression, brake, neutral, reverse, neutral, low, second, neutral, third, high.

It will be seen from the foregoing that my transmission with its emergency operating device can be used either as a selective or as a progressive transmission and has the advantages of both.

Referring more particularly to Figure 56 it will be seen that the finger 273 does not extend so as to include all of the levers 260, the purpose of this is to permit application of the brake by means of the lever 258 irrespective of the position of the lever 92. It is to be understood however that the finger 273 can move sufficient of the levers 260 to neutralize all other speeds, it being necessary that only one of the levers 260 contributing to form any particular speed be neutralized.

Figure 65:
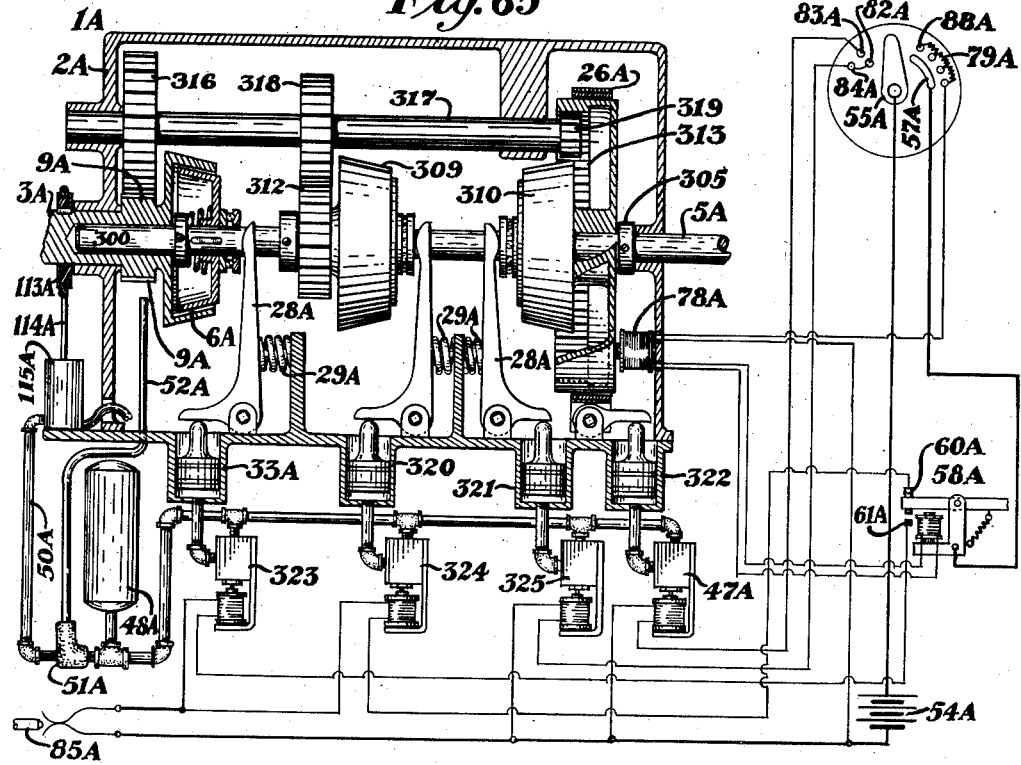
Figure 65 is a schematic diagrammatic representation similar to Figure 1, of another embodiment of my invention. This diagram illustrates the electrical mechanical and hydraulic connection only and is not to be used as a representation of either the exact construction of the device or location of the parts shown.
Figure 66:
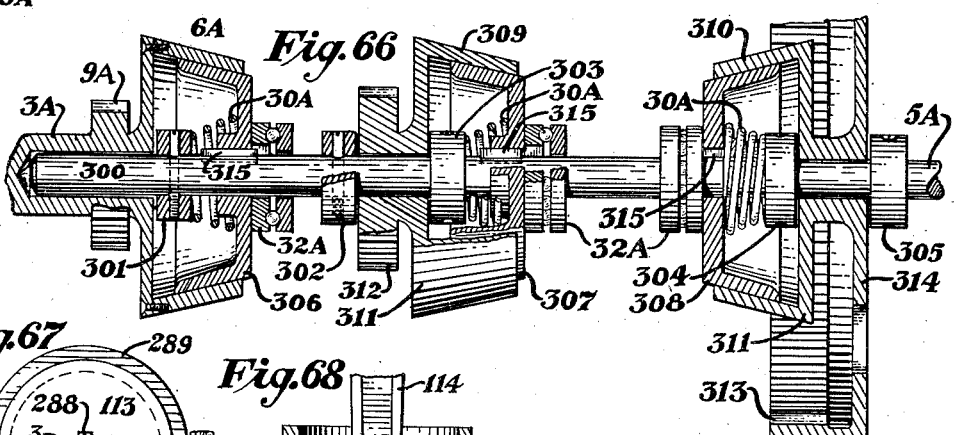
Figure 66 is an enlarged view partly in section of the driving, and driven shafts shown in Figure 65, and the clutches and gears mounted thereon.

In Figures 65 and 66 is illustrated diagrammatically one of the many possible variations of my invention wherein a somewhat different power transmitting portion is used. This transmission is arranged to give two speeds forward, one speed backward and brake effect, but a person skilled in this art can readily modify it to give any other speeds desired.

Referring to the Figures 65 and 66 of the drawings, wherein parts similar to parts in the previously described embodiment of my invention are given the same numbers followed by the letter "A" and new parts are given numbers 300 or above, IA represents an automatic transmission comprising a case 2A having rotatively mounted therein a driving shaft 3A and a driven shaft 5A.

The driving shaft 3A has fastened thereon a driving gear 9A and a portion of the clutch 6A. The extending portion 300 of the driven shaft 5A is loosely mounted in an apertured portion of the said driving shaft 3A. The driven shaft 5A has fastened thereon collars 301, 302, 303, 304 and 305 (see Figure 66), and has slidably mounted thereon the portions 306, 307 and 308 respectively of the clutches 6A, 309 and 310. Compression springs 30A are adapted to cause engagement of the clutches 6A, 309 and 310. Springs 29A acting through the agency of the levers 28A are adapted to cause disengagement of the said clutches 6A, 309 and 310. The clutch 309 is provided with a portion 311 that is fast to a gear 312. This gear 312 is loosely mounted on the driven shaft 5A. The clutch 310 is provided with a portion 311 that is fast to an internal gear 313. This internal gear 313 is loosely mounted on the said driven shaft 5A and is provided with a web 314 that is apertured like the aforedescribed drum 17, so that it can operate as the rotating element of the generator 78A.

The portions 306, 307 and 308 of the clutches 6A, 309 and 310 respectively are slidably fastened to the driven shaft 5A by means of keys 315, and are provided with anti-friction thrust bearings 32A.

The driving gear 9A engages with a gear 316 that is fast on a counter shaft 317. This counter shaft 317 is suitably journaled in the case 2A and has also fast thereon gears 318 and 319. Gear 318 engages with the aforedescribed gear 312. Gear 319 engages with the internal gear 313. A brake band 26A is provided for clamping the internal gear 313 when necessary.

Engaging only the clutch 309 enables power to be transmitted from the driving shaft 3A to the gear 9A, gear 316, counter shaft 317, gear 318, gear 312, clutch 309, to the driven shaft 5A. This constitutes the low speed, the reduction being controlled by the relative size of the gears 9A, 316, 318 and 312.

Engaging only the clutch 6A enables power to be transmitted directly from the driving shaft 3A to the driven shaft 5A, this constitutes the high speed position.

Engaging only the clutch 310 enables power to be transmitted from the driving shaft 3A, the gear 9A, the gear 316, the counter shaft 317, the gear 319, the internal gear 313, the clutch 310, to the driven shaft 5A, this constitutes the reverse drive, wherein the shaft 5A is rotated in an opposite direction to that of the driving shaft 3A.

Simultaneous application of both the clutch 310 and the brake band 26A results in brake action.

Neutral is obtained by all the clutches and the brake band being disengaged. Springs 29A keep the clutches disengaged when required. Springs previously described and shown in Figures 15, 26, 27 and 29 keep the brake band 26A disengaged when it is so required.

The remaining elements such as the controller 80A, relay 58A, reservoir 48A, check and relief valve 51A, master switch 85A, battery 54A, cylinders 33A, 320, 321, 322 (for operating the levers 28A and the brake band 26A), electromagnetically operated valves 323, 324, 325 and 47A are similar to and function in precisely the same manner as the similar portions previously described. The valves 323, 324 and 325 are here shown of somewhat different construction than valve 47A although they may be of exactly the same structure. They are therefore given new numbers. They, however, function similarly to valve 47 previously described. The cylinders 320, 321 and 322 are identical with cylinder 33A previously described. It is seen that by electrically energizing only the valve 323, the high speed will be engaged, that by electrically energizing only the valve 324 the low speed will be engaged, that by electrically energizing only the valve 325 the reverse speed will be engaged, and that by simultaneously electrically energizing the valves 325 and 47A, brake action will be obtained. The forward speeds and the reverse and brake action can be obtained by manipulating the lever 55A of the controller 80A in the manner previously described.

The master switch 85A is so connected that it neutralizes the forward speeds only. It preferably is operated by a foot pedal as has previously been described.

As in this embodiment of my invention there are only two forward speeds, only one relay 58A is necessary. When it contacts at 60A and the lever 55A contacts with the contact strip 57A and the contact 88A of the rheostat 79A in the controller 80A, the electric connections are correct for energizing valve 324 and production of the low speed. With the lever 55A still in this position and the relay 58A contacting at 61A, the electric circuits are correct for energizing the valve 323 and causing engagement of the high speed.

Due to difference in the number of speeds, etc. available in this embodiment of my invention the controller 80A has its contacts 84A and 82A constructed somewhat differently than that previously illustrated, but their function is similar as can readily be seen from the drawings (see Figure 65).

The driving shaft 3A has fast thereon an eccentric 113A which latter has loosely mounted thereon a connecting rod 114A of a pump 115A. A pipe line 50A connects the said pump 115A with the reservoirs 48A, thus replenishing the fluid in the reservoir 48A. When more fluid is pumped than is used by the cylinders 33A, 320, 321 and 322 excess fluid escapes by way of the check and relief valve 51A and the pipe line 52A. Fluid escaping at 52A is so directed that it assists in lubrication of the transmission.

Another embodiment of my invention

In Figure 69 is illustrated another embodiment of my invention. This embodiment differs from my previously described transmissions, in that it has no direct drive and in certain other features hereinafter to be described.

In describing this figure parts similar in construction and usage to portions already described in connection with the preferred and first described embodiment will be referred to by the number originally used followed by a B such as 2B for the casing, 57B for the controller, etc. All other parts which vary in structure from parts already described in connection with the description of the said preferred embodiment will be referred to by reference number 400 and over.

This transmission 1B comprises a case 2B having suitably journaled therein, a driving shaft 3B and a driven shaft 5B. The said driving shaft 3B has fast thereon gears 9B, 400, 401 and 402. It also has fast thereon collar 403 and eccentric 113B. This eccentric has loosely mounted thereon a connecting rod 114B that operates a pump 115B. The gear 9B engages with a gear 404 that is fast to a clutch housing 405. Both the gear 404 and the clutch housing 405 are loosely mounted on the driven shaft 5B and are kept in their correct lateral position by means of collars 406 and 407 which are fast on the said shaft 5B. The said clutch housing 405 has mounted therein a clutch cone 408 which is slidably mounted upon the said shaft 5B but must rotate therewith due to the key 409. A compression spring 410 having one end pressing against the said collar 406 the other end pressing against the clutch cone 408 tends to keep the clutch 441, which is composed of the housing 405 and the cone 408, in engagement. An anti-friction bearing 411 and a clutch release lever 28B enable the spring 29B that is stronger than the aforementioned spring 410 to keep the said clutch 441, normally disengaged. A piston 412 mounted in a cylinder 413 is suitably positioned so that fluid under pressure entering into the said cylinder 413 will cause motion of the said piston 412 and thus by moving the lever 28B and compressing the spring 29B enable the spring 410 to cause engagement of the clutch 441.

It will be seen from the drawings that engagement of the clutch 441 secures the aforementioned gear 404 to the driven shaft 5B and enables power to be transmitted from the driving shaft 3B through the gear 9B and the gear 404 and the described clutch assembly 441 to the driven shaft 5B. This is the lowest speed. The gear 400 intermeshes with a gear 414. This gear 414 is identical in mounting and accessories, including its clutch 442 with the described gear 404. It is controlled through its clutch 442 which is identical with the clutch 441 to the gear 404, by means of the piston 415 mounted in the cylinder 416. The gear 401 engages with a gear 417. This gear is likewise provided with clutch 443, collars etc. similar to those described in connection with gear 404 and being similarly mounted can be similarly controlled by means of a piston 418 mounted in a cylinder 419. The gear 402 engages with an idler gear 420 that is loosely mounted on a shaft 421. This shaft 421 is fast at 422 to the case 2B. The idler gear 420 engages with a gear 423. This gear 423 is provided with a clutch 444, collars and like accessories similar to that described in conjunction with the description of gear 404 and being similarly mounted can be similarly controlled by means of a piston 424 mounted in a cylinder 425.

It will be seen that admitting fluid under pressure to any one of the cylinders 413, 416, 419 or 425 will result in, as has been described, permitting their respective clutches to engage and thus establish operative connection between the driving shaft 3B and the driven shaft 5B through any one of the set of gears. The gears 9B, 400 and 401 are arranged to drive the driven shaft 5B in an opposite direction to that of the driving shaft 3B. The gear train driven by the gear 402 is arranged to enable the driving shaft 3B to drive the driven shaft 5B in the same direction as that in which it rotates.

It will be seen from the drawings that the gear train driven by the gear 9B will produce the slowest reverse motion, while the gear train driven by the gear 401 will produce the fastest reverse motion. As it is intended that these two gear trains together with the gear train driven by the gear 400 be used to produce forward motion in the machine driven, it is necessary that the driven shaft 5B be geared to its load in a manner opposite hand to that in which it would be geared were it the driven shaft of either one of the other transmissions herein described. When this is the case it will be seen that these three gear trains will result in forward drive while the gear train driven by the gear 402 will result in a reverse drive.

The driven shaft 5B has fast thereon at 426 a brake drum 427 that has mounted thereon a brake band 428. A piston 429 contained in a cylinder 430 is adapted to cause engagement of the said brake band 428 when fluid under pressure is introduced to interior of the said cylinder 430. The brake band 428 is identical in construction and provided with the same accessories as the brake band 26 best seen in Figure 15, except that its operating mechanism is arranged opposite hand.

Electromagnetically operated valves 431, 432, 433, 434 and 435 are provided for the purpose of controlling the flow of fluid to the cylinders 430, 413, 416, 419 and 425 respectively and are connected thereto by means of pipe lines 87B. The said valves 431, 432, 434 and 435 are identical in construction to the valve 47 best seen in Figure 37. The valve 433 is identical in construction to the valve 43 (best seen in Figures 35 and 36). A pipe line 49B supplies fluid under pressure to these valves from the reservoir 48B. The supply of fluid in this reservoir 48B is replenished by the pump 115B. This pump 115B draws fluid from the interior of the case 2B and pumps it into the reservoir 48B by way of the pipe line 50B and the check and relief valve 51B. This check and relief valve 51B is identical in construction to the check and relief valve 51 (best seen in Figure 19) and is provided with an overflow pipe 52B.

Current for operating the valves 432, 433 and 434 is supplied by the battery 54B and is automatically controlled by means of the controller 80B. The relays 58B and 62B are identical in construction to the relays illustrated in Figures 33 and 34. The controller 80B is similar to the controller 80 best seen in Figures 10 and 11 except that its contact 84B is positioned at a distance from the other contacts.

Although it is possible to aperture the brake-drum 427 similar to the reverse drum 17 and provide this transmission with a generator similar to that illustrated in Figure 16, I preferably employ a different but equivalent generator. The pulley 436 is fast on the driven shaft 5B and by means of a belt 437 drives the pulley 438 of a dynamic electric generator 439. This generator may be any type of generator having an output that varies with the speed and while it will operate properly if its field were energized from an outside source such as the battery 54B and its armature connected to the relays 58B and 62B in a manner similar to that illustrated in Figure 1, I preferably employ somewhat different but equivalent connections and use for the generator 439 a form of generator that needs no outside excitation of its field. The electrical connections are as follows: Battery 54B is connected to the lever 55B. For forward speeds the operator can by manipulation of the lever 55B cause it to contact with the strip 57B and the contacts 88 of the rheostat 79B. There will now be two distinct circuits. (1) The generator circuit; Current flowing from the generator by way of line 440 flows to the lever 55B through the rheostat 79B to the relays 58B and 62B and thence back to the generator 439. The two relays 58B and 62B are herein connected in parallel and are provided with coils, springs and air gaps such that relay 58B will be attracted before 62B and relay 62B will release before relay 58B. (2) The valve circuit; Current from the battery 54B will flow to the lever 55B and from there to the body portion of the relay 58B and through contacts 59B to the valve 432 then to the master switch 85B and from there back to the battery 54B completing the circuit and energizing the valve 432.

As has been described this will set in motion mechanism resulting in an operative connection between the driving shaft 3B and the driven shaft 5B, thus enabling the driving shaft 3B to drive the driven shaft 5B and therefore the generator 439. When sufficient speed of the driven shaft 5B and therefore the generator 439 has been attained, sufficient current will flow through the coil of the relay 58B to cause it to attract its armature opening the contact 59B and closing the contact 61B. The electrical circuit will now be as follows: Current flowing from the battery 54B to the lever 55B and the strip 57B will flow to the body portion of the relay 58B to the contact 61B to the body portion of the relay 62B to the contact 63B to the coil 433 to the master switch 85B and then back to the battery 54B forming a complete electrical circuit and energizing the coil 433. This will set in motion mechanism wherein the driving shaft 3B can drive the driven shaft 5B faster than it did in the previously described speed. Increased speed of the driven shaft 5B will result in increased speed of the generator 439 and will cause the relays 62B to attract its armature opening the contact 63B and closing the contact 65B. The relay electrical circuit will now be as follows: Current flowing from the battery 54B to the lever 55B and the strip 57B will flow through the body portion of the relay 58B through the contact 61B to the body portion of the relay 62B through the contact 65B to the valve 434 to the master switch 85B and back to the battery 54B forming a complete electrical circuit and energizing the valve 434. Energizing this valve will set in motion mechanism wherein operative connection is established between the driving shaft 3B and the driven shaft 5B enabling the driving shaft 3B to drive the driven shaft 5B at a faster speed than the preceeding speed described. This is the fastest speed available in this described embodiment of my invention, but persons skilled in this art will readily see that by adding additional gear trains, valves and relays similar to the ones herein shown and described, any desired number of additional speeds can be readily obtained. It will also be seen that by removing one of the described gear trains, valves and relays a two speed transmission will result.

*Nonautomatic speeds*

In addition to the forward speeds described, this transmission also has a reverse speed and brake effect which are obtained as follows:

*First brake effect*

The operator by manipulating lever 55B can cause it to contact simultaneously with the contact 83B and the contact strip 82B. In this position the electrical circuits are such that both the valves 431 and 433 are energized. This results in two distinct things (a) a brake effect due to the engagement of brake-band 428, and (b) an intermediate speed effect due to the engagement of the clutch 442. The brake-effect thus produced is gradual and is particularly useful in descending steep hills and in preventing skidding.

*Second brake effect*

The second brake-effect is particularly useful as a parking brake and emergency brake. It is obtained by moving the lever 55B so that it contacts only with the strip 82B. In this position the electrical circuit is such that only the valve 431 is energized thus causing engagement of the brake-band 428.

*Reverse speed*

Reverse speed is obtained by causing lever 55B to contact only at 84B. In this position the electrical circuit is such that only the valve 435 is energized. This results in the actuation of the driven shaft 5B through the gear train controlled by the clutch 444, which, as has been described, causes a reverse drive.

It is to be understood that the above disclosure is by the way of illustration only and not by the way of limitation since many changes can be made in the details of construction, the arrangement of parts and the materials used without in any way departing from the spirit of my invention.

It is my desire therefore, that the claims which are hereunto appended to define my invention should be limited only by the prior art.

Having described my invention what I claim is:

1. Power transmitting mechanism comprising driving and driven members, a plurality of trains of transmission gears for operatively connecting the said driving and driven members at any one of a plurality of gear ratios, controlling means for engaging any one of the said plurality of trains of gearing and establishing operative connection between the said driving and driven members, and an electrical governor controlling the said controlling means, the said electrical governor comprising means for producing a varying electric current and means responsive to the said varying electric current for controlling the said controlling means.

2. Power transmitting mechanism comprising driving and driven members, transmission gears and frictional means operatively connecting the said driving and driven members, fluid means operatively controlling the said frictional means, and an electrical governor operatively controlling the said fluid means, the said electrical governor comprising, means for producing a varying electric current and means responsive to the said varying electric current for controlling the said fluid means.

3. Power transmitting mechanism comprising driving and driven members, transmission gears and frictional means operatively connecting the said driving and driven members, fluid means operatively controlling the said frictional means, an electrical governor operatively controlling the said fluid means, and means operatively connected to the said electrical governor whereby the operator can control the said governor, the said electrical governor comprising, means for producing a varying electric current and means responsive to the said varying electric current for controlling the said fluid means.

4. In a transmission, driving and driven members; transmission gears and frictional means for operatively connecting the said driving and driven members; fluid actuated means for operatively controlling the said frictional means; a reservoir of fluid for supplying fluid to the said fluid actuated controlling means; means for replenishing the supply of fluid in the said reservoir; means whereby excess actuating fluid is delivered to certain working parts of the transmission for lubricating the same, and means whereby the operator can control the said fluid actuated controlling means.

5. Power transmitting mechanism comprising driving and driven members, transmission gears and frictional means operatively connecting the said driving and driven members, fluid means operatively controlling the said frictional means, an electrical governor operatively controlling the said fluid means, means operatively connected to the said electrical governor and the said fluid means whereby the operator can control the said governor and the said fluid means, and a second means operatively connected to the said fluid means whereby the operator can control the said fluid means.

6. Power transmitting mechanism comprising driving and driven members, transmission gears and clamping means operatively connecting the said driving and driven members, controlling means operatively controlling the said clamping means, and an electrical governor operatively controlling the said controlling means, the said electrical governor comprising, means for producing a varying electric current and means responsive to the said varying electric current for controlling the said controlling means.

7. Power transmitting mechanism comprising driving and driven members, transmission gears and clamping means operatively connecting the said driving and driven members, controlling means operatively controlling the said clamping means, an electrical governor operatively controlling the said controlling means, and a second means operatively connected to the said controlling means whereby the operator can control the said controlling means, the said electrical governor comprising, means for producing a varying electric current and means responsive to the said varying electric current for controlling the said controlling means.

8. Power transmitting mechanism comprising driving and driven members, transmission gears and clamping means operatively connecting the said driving and driven members, controlling means operatively controlling the said clamping means, an electrical governor operatively controlling the said controlling means, and means operatively connected to the said electrical governor whereby the operator can control the said governor, the said electrical governor comprising, means for producing a varying electric current and means responsive to the said varying electric current for controlling the said controlling means.

9. Power transmitting mechanism comprising driving and driven members, transmission gears and frictional means operatively connecting the said driving and driven members, controlling means operatively controlling the said frictional means, an electrical governor operatively controlling the said controlling means, means operatively connected to the said electrical governor and the said controlling means whereby the operator can control the said controlling means and the said governor, and a second means operatively connected to the said controlling means whereby the operator can control the said controlling means.

10. Power transmitting mechanism comprising driving and driven members, transmission gears and frictional means operatively connecting the said driving and driven members, controlling means operatively controlling the said frictional means, an electrical governor operatively controlling the said controlling means, means operatively connected to the said electrical governor whereby the operator can control the said governor and a second means operatively connected to the said controlling means whereby the operator can control the said controlling means.

11. Power transmitting mechanism comprising driving and driven members, gears and frictional means operatively connecting the said driving and driven members, resilient means of predetermined strength adapted to cause the engagement of the said frictional means, second resilient means of greater strength than the first said resilient means for keeping the said frictional means out of engagement, and a governor operatively controlling the said second resilient means.

12. Power transmitting mechanism comprising driving and driven members, gears and clutches operatively connecting the said driving and driven members, resilient means of predetermined strength adapted to cause the engagement of the said clutches, second resilient means of greater strength than the first said resilient means for keeping the said clutches out of engagement, and a governor operatively controlling the said second resilient means.

13. Power transmitting mechanism comprising driving and driven members, gears and frictional means operatively connecting the said driving and driven members, resilient means of predetermined strength adapted to cause the engagement of the said frictional means, second resilient means of greater strength than the first said resilient means for keeping the said frictional means out of engagement, and an electrical governor operatively controlling the said second resilient means.

14. A transmission comprising driving and driven members, gears and frictional means for operatively connecting the said driving and driven members, controlling means for selectively controlling the said frictional means, and an electrical governor controlling the said controlling means, the said electrical governor consisting of relay mechanism responsive to an intermittent current and a means for delivering the said intermittent current.

15. A transmission comprising driving and driven members, gears and frictional means for operatively connecting the said driving and driven members, controlling means for selectively controlling the said frictional means, and an electrical governor controlling the said controlling means, the said electrical governor consisting of relay mechanism responsive to an intermittent current, and a generator for delivering the said intermittent current.

16. A transmission comprising driving and driven members, gears and frictional means operatively connecting the said driving and driven members, controlling means for selectively controlling the said frictional means, relay mechanism for controlling the said controlling means, a generator operatively connected to the driving and driven members for generating current for controlling the said relay mechanism and means operatively connected to the said generator whereby the operator can control the output of the said generator.

17. A transmission comprising driving and driven members, gears and frictional means operatively connecting the said driving to said driven members, controlling means for selectively controlling the said frictional means; voltage responsive relay mechanism for controlling the said controlling means, a generator for delivering current to the said relay mechanism the voltage of the said current varying with the speed of the said generator.

18. In a transmission a driving member, a driven member, a plurality of trains of gearing and frictional means for operatively connecting the said driving and driven members at any one of a plurality of speeds, one of the said speeds being reverse, fluid actuated controlling mechanism for the said frictional means, and means controlled by the operator and connected to the said fluid actuated controlling mechanism whereby the operator can cause engagement of any one of the said speeds including the reverse and can cause engagement of a plurality of the said speeds causing brake action, the said means in the control of the operator being so arranged that the operator must secure the said brake action when the said operator controlled means is in a position intermediate its forward and reverse speed positions.

19. In a transmission a driving member; a driven member; transmission gears and frictional means operatively connecting the said driving and driven members; cam mechanism for applying the said frictional means, the said cam mechanism being adapted to first bring close to each other the co-operating portions of the said frictional means and then forcibly applying the same; controlling means for the said frictional means; and a governor controlling the said controlling means.

20. Power transmitting mechanism comprising driving and driven members, transmission gears and frictional means operatively connecting the said driving and driven members, electrically controlled controlling means operatively controlling the said frictional means, a governor operatively controlling the said controlling means and means intermediate the said controlling means and the said governor whereby the operator can neutralize the said transmission.

21. Power transmitting mechanism comprising driving and driven members, transmission gears and frictional means operatively connecting the said driving and driven members, electrically controlled fluid operated means operatively controlling the said frictional means, a governor operatively controlling the said electrically controlled fluid operated means, means operatively connected to the said governor whereby the operator can control the said governor and a master switch intermediate the said governor and the said electrically controlled fluid actuated means whereby the operator can neutralize the said power transmitting mechanism.

22. Power transmitting mechanism comprising driving and driven members, transmission gears and clamping means operatively connecting the said driving and driven members, electrically controlled controlling means controlling the said clamping means, and an electrical governor controlling the said controlling means, the said electrical governor comprising, means for producing a varying electric current and means responsive to the said varying electric current for controlling the said controlling means.

23. Power transmitting mechanism comprising driving and driven members, transmission gears and frictional means operatively connecting the said driving and driven members, electrically controlled controlling means controlling the said frictional means, an electrical governor controlling the said controlling means, means operatively connected to the said electrical governor whereby the operator can control the said governor, and a second means operatively connected to the said controlling means whereby the operator can control the said controlling means, the said electrical governor comprising, means for producing a varying electric current and means responsive to the said varying electric current for controlling the said controlling means.

24. Power transmitting mechanism comprising driving and driven members, transmission gears and frictional means operatively connecting the said driving and driven members, controlling means operatively controlling the said frictional means, a governor operatively controlling the said controlling means, means connected to and driven by the said driven member, brake mechanism external of the said power driven mechanism and operatively connected to the said driven means for braking the said driven means, and a pedal operatively connected to the said controlling means and the said brake mechanism whereby the operator can control the said controlling means and brake mechanism.

25. Power transmitting mechanism comprising driving and driven members, transmission gears and frictional means operatively connecting the said driving and driven members, resilient means operatively connected to the said frictional means for applying the said frictional means, second resilient means of greater strength than first said resilient means for releasing the said frictional means, controlling means for controlling the said second resilient means and a governor operatively connected to and controlling the said controlling means.

26. In a transmission a driving member; a driven member; transmission gears; brake bands and clutches for operatively connecting the said driving and driven members; cam mechanism for applying the said brake bands, the said cam mechanism being adapted to first rapidly bring the brake bands close to their respective brake drums and then forcibly applying same; controlling mechanism for the said brake bands and clutches; and a governor controlling the said controlling mechanism.

27. Power transmitting mechanism comprising a driving member; a driven member; a gear fast to the said driving member; a gear fast to the said driven member; a sun gear; a carrier; planet gears carried by the said carrier, the said planet gears being adapted to connect the said gears carried by the said driving and driven members and the said sun gear; frictional means for controlling the said sun gear and the said carrier; and a governor controlling some of the said frictional means.

28. Power transmitting mechanism comprising driving and driven members, a plurality of trains of transmission gears and frictional means operatively connecting the said driving and driven members whereby a plurality of speeds may be selectively obtained, fluid operated controlling means for controlling each of the said frictional means and means in the control of the operator operatively connected to the said controlling means for simultaneously applying a plurality of frictional means in any one train of gears whereby brake action on the driven member may be obtained.

29. Power transmitting mechanism comprising driving and driven members, a plurality of trains of transmission gears and frictional means operatively connecting the said driving and driven members, fluid operated controlling means for simultaneously selectively controlling a plurality of the said frictional means whereby speeds forward, or reverse or brake action may be obtained, and means in the control of the operator and connected to the said fluid controlling means for securing speeds in the progression in the order of forward, brake action and reverse the said brake action being obtained by application of a plurality of frictional means operating on one of the said pluralities of trains of transmission gears.

30. A transmission comprising a plurality of series connected speed changing units, each of the said units including a driving member, a driven member, and transmission gears and a plurality of frictional means for operatively connecting the said driving and the said driven members, controlling mechanism for simultaneously selectively controlling a plurality of the said frictional means, one in each unit for forward and reverse speeds and two in any one unit for producing brake action, and means operatively connected to the said controlling means whereby the operator can control the said controlling means.

31. A transmission comprising a plurality of series connected speed changing units, each of the units comprising a driving member, a driven member, and transmission gears and frictional means for operatively connecting the said driving and driven members, fluid actuated controlling mechanism for controlling the said frictional means, an electrical governor for operatively controlling the said fluid actuated controlling mechanism, and means whereby the operator can control the said governor.

32. In a transmission a driving member; a driven member; a housing rotatively mounted on the said driving and driven members; a gear fast on the said driving member; a gear fast on the said driven member; transmission gears rotatively mounted in the said housing and operatively connecting the said gear carried by the said driving member with the said gear carried by the said driven member; a brake band adapted to hold the said housing; cam mechanism operatively controlling the said brake band, the said cam mechanism having two distinct steps, the first step being adapted to rapidly cause the brake band to approach the housing, the second step being adapted to forcibly apply the said brake band to the said housing; fluid operated controlling mechanism for the said cam mechanism; and means whereby the operator can control the said fluid operated controlling mechanism.

33. A transmission comprising driving and driven members, transmission gears and a plurality of frictional means for operatively connecting the said driving and driven members at any one of a plurality of speeds both forward and reverse, fluid actuated means for the said frictional means and manually operated means in the control of the operator whereby the operator can control the said fluid actuated means and cause it to control the frictional means whereby it can produce forward speeds, reverse speeds, and brake action, the said manually operated means, being restricted to a motion wherein the brake action must be engaged in passing between the forward and the reverse speeds the said brake action being obtained by simultaneous application of a plurality of the said frictional means.

34. Power transmitting mechanism comprising driving and driven members, a plurality of trains of gearing for operatively connecting the said driving and driven members at any one of a plurality of gear ratios, controlling means for connecting some of the said trains of gearing with the said driving and driven members thereby establishing operative connection between the said driving and driven members, and an electrical governor for controlling the said controlling means, the said electrical governor consisting of relay mechanism responsive to a varying current and means whereby the said current is caused to vary by changes in the rate of speed of one of the said driving and driven members.

35. Power driven mechanism comprising driving and driven members, change speed gears and frictional means for operatively connecting the said driving and driven members, an electrical governor controlling the said frictional means and causing these said frictional means to establish operative connection between the said driving and driven members, and a variable resistance electrically connected to the said electrical governor, the said variable resistance varying the electric current flowing in the said electrical governor and thus modifying the action of the said governor.

36. A transmission comprising a plurality of series connected speed changing units and a governor controlling all of the said series connected units, each of the said units consisting of: a driving member, a driven member, transmission gears and frictional means for operatively connecting the said driving and driven members, and an electrically controlled controlling mechanism controlling the said frictional means and being controlled by the said governor.

37. A transmission comprising a plurality of series connected speed changing units, a governor controlling some of said units and means controllable by the operator controlling some of the said units, each of the said governor controlled units comprising: a driving member, a driven member, transmission gears and frictional means for operatively connecting the said driving and driven members, and an electrically controlled controlling mechanism controlling the said frictional means and being controlled by the governor; each of the said operator controlled units comprising, a driving member, a driven member, transmission gears and frictional means for operatively connecting the said driving and driven members, and an electrically controlled controlling mechanism controlling the said frictional means and being controlled by the said means controllable by the operator.

38. Power transmitting mechanism comprising driving and driven members, transmission gears and synchronizing coupling mechanism for operatively connecting the said driving and driven members and an electrical governor controlling the said synchronizing coupling mechanism, the said electrical governor comprising, means for producing a varying electric current and means responsive to the said varying electric current for controlling the said synchronizing coupling mechanism.

39. Power transmitting mechanism comprising driving and driven members, a plurality of trains of transmission gears and synchronizing coupling mechanisms for operatively connecting the said driving and driven members at a plurality of gear ratios and an electrical governor controlling the said synchronizing coupling mechanism, the said electrical governor comprising, means for producing a varying electric current and means responsive to the said varying electric current for controlling the said synchronizing coupling mechanism.

MATTHEW STUCATUR.